(12) United States Patent
Arone et al.

(10) Patent No.: US 7,401,064 B1
(45) Date of Patent: *Jul. 15, 2008

(54) METHOD AND APPARATUS FOR OBTAINING METADATA FROM MULTIPLE INFORMATION SOURCES WITHIN AN ORGANIZATION IN REAL TIME

(75) Inventors: Geoffrey Arone, Boston, MA (US); Gregory Blumstein, San Francisco, CA (US); Edward Chen, San Mateo, CA (US); Nalin Mittal, San Francisco, CA (US)

(73) Assignee: Data Advantage Group, Inc., San Francisco, CA (US)

( * ) Notice: Subject to any disclaimer, the term of this patent is extended or adjusted under 35 U.S.C. 154(b) by 365 days.

This patent is subject to a terminal disclaimer.

(21) Appl. No.: 10/291,309

(22) Filed: Nov. 7, 2002

(51) Int. Cl.
*G06F 12/00* (2006.01)
(52) U.S. Cl. .................. 707/1; 707/200; 707/100; 710/2; 710/38
(58) Field of Classification Search ............... 707/100, 707/2, 5, 9–10; 709/3, 9–10
See application file for complete search history.

(56) References Cited

U.S. PATENT DOCUMENTS

| | | | |
|---|---|---|---|
| 6,438,544 B1 | | 8/2002 | Grimmer et al. |
| 6,877,044 B2 * | | 4/2005 | Lo et al. ................ 710/2 |
| 2001/0011247 A1 * | | 8/2001 | O'Flaherty et al. ........ 705/39 |
| 2003/0233365 A1 * | | 12/2003 | Schmit et al. ............ 707/100 |
| 2004/0039729 A1 * | | 2/2004 | Boger et al. .............. 707/2 |
| 2004/0098394 A1 * | | 5/2004 | Merritt et al. ............ 707/100 |
| 2004/0181558 A1 * | | 9/2004 | Williams et al. .......... 707/200 |
| 2004/0205473 A1 * | | 10/2004 | Fisher et al. ............. 715/500 |

* cited by examiner

*Primary Examiner*—Charles Rones
*Assistant Examiner*—Belix M Ortiz
(74) *Attorney, Agent, or Firm*—Blakely, Sokoloff, Taylor & Zafman LLP

(57) ABSTRACT

A method and apparatus for obtaining metadata from multiple information sources in real time are described. According to one aspect, the method includes receiving a user request pertaining to one or more of source metadata objects residing in multiple source metadata repositories. Each source metadata repository is maintained by a specific data management application. The method further includes responding to the user request in real time by identifying a data management application that corresponds to the source metadata objects associated with the user request and retrieving the source metadata objects using an application program interface (API) with the corresponding data management application.

30 Claims, 19 Drawing Sheets

METHOD AND APPARATUS FOR OBTAINING METADATA FROM MULTIPLE INFORMATION SOURCES WITHIN AN ORGANIZATION IN REAL TIME

FIELD OF THE INVENTION

The present invention relates to data storage and management; more particularly, the present invention relates to managing metadata stored in various information sources.

BACKGROUND OF THE INVENTION

The ability to collect, analyze, and manage massive amounts of information has become a necessity in business today. It is common for a large enterprise to employ multiple data management tools and/or multiple instances of a single tool in processing its transactional data. Such tools may include reporting tools (e.g., business intelligence (BI) tools offered by Business Objects Inc. of San Jose, Calif.), data integration tools (e.g., data extraction/transformation/loading tools offered by Informatica Corporation of Redwood City, Calif.), database management systems, modeling tools, customer relationship management (CRM) tools, etc. Each of these tools typically maintains a data management application to store data pertaining to various operations conducted by an enterprise and a metadata repository to store metadata describing the content and structure of the transactional data.

The use of multiple, different third party data products within an enterprise may result in unnecessary data redundancy and data quality problems unless an efficient management of metadata residing in various metadata repositories is provided.

Existing metadata management products typically collect metadata from metadata repositories within an enterprise by copying metadata maintained by each third party product into a central repository. However, this approach has several major flaws. First, copying data from external repositories is usually a time-consuming process involving the execution of batch-oriented programs. The design, implementation and configuration on the system is time consuming and must be maintained over time. Next, because metadata in source systems constantly changes, information in the central repository may often be out-dated even if a time-consuming data synchronization process is performed periodically. Further, current metadata management products typically fail to provide flexibility in customizing the metadata environment and are designed for use by technical staff such as a database administrator or a system administrator rather than non-technical personnel.

Therefore, what is needed is a metadata management tool that would overcome the disadvantages of the prior art.

SUMMARY OF THE INVENTION

A method and apparatus for obtaining metadata from multiple information sources in real time are described. According to one aspect, the method includes receiving a user request pertaining to one or more of source metadata objects residing in multiple source metadata repositories. Each source metadata repository is maintained by a specific data management application. The method further includes responding to the user request in real time by identifying a data management application that corresponds to the source metadata objects associated with the user request and retrieving the source metadata objects using an application program interface (API) with the corresponding data management application.

Other features of the present invention will be apparent from the accompanying drawings and from the detailed description that follows.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIGS. 4A-4F show exemplary user interfaces generated by a virtual metadata repository module.

DETAILED DESCRIPTION OF THE PRESENT INVENTION

Figure 1:
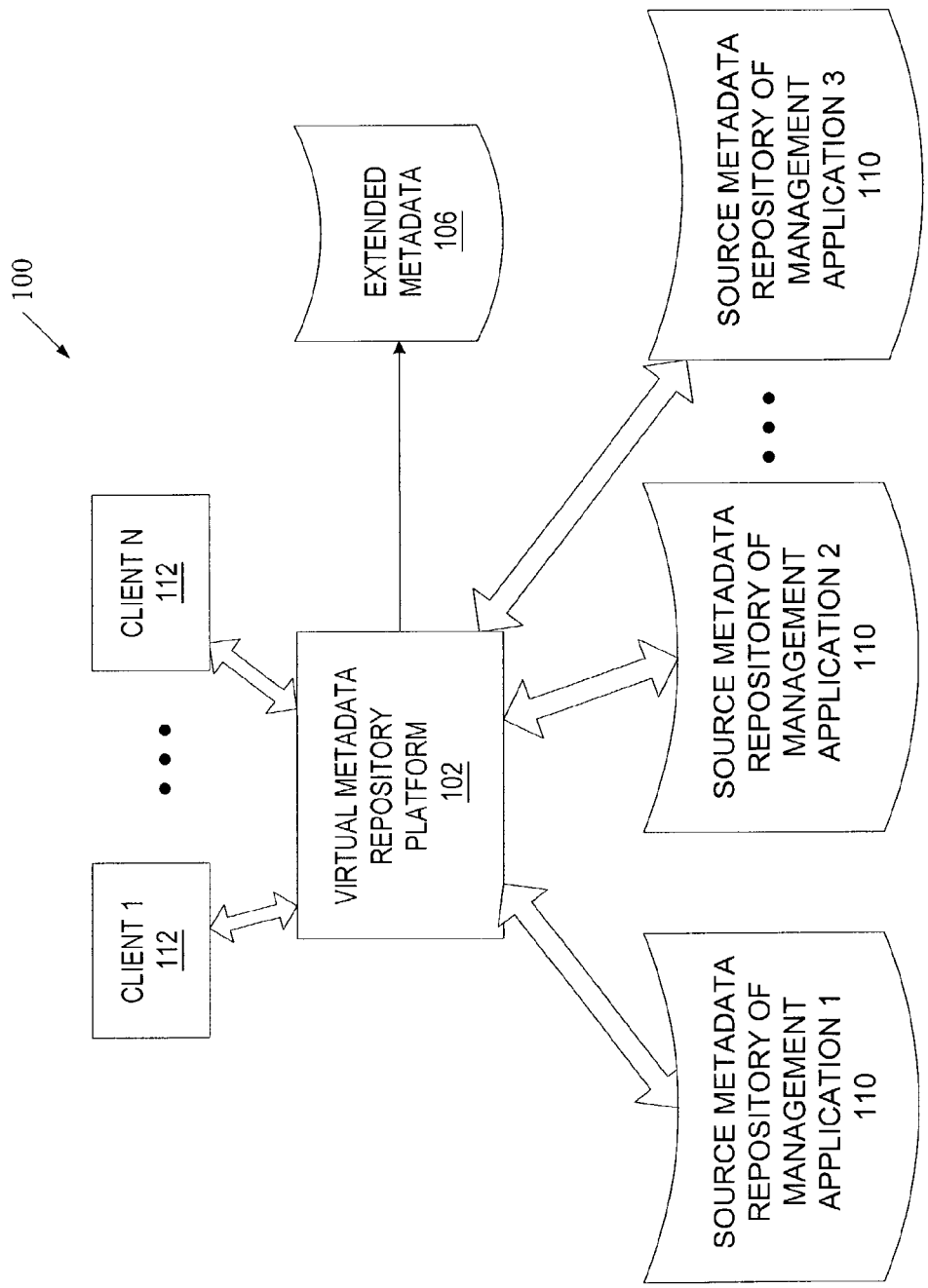
FIG. 1 is a block diagram of one embodiment of a system for managing metadata residing in various information sources within an organization.

A method and apparatus for obtaining metadata from multiple information sources in real time are described. In the following description, numerous details are set forth. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Overview

As described above, existing metadata management products typically copy and store metadata from multiple metadata repositories within an enterprise into a central repository and then allow users to browse and analyze the metadata stored in the central repository. The copying process is time-consuming and requires the development of a physical schema and the maintenance of this schema over time as applications change. In addition, the copying process typically results in storage of out-dated information in the central repository.

One embodiment of the present invention solves this problem by utilizing a virtual metadata repository approach. The virtual metadata repository approach uses a user interface that represents a single point for user access to source metadata residing in source metadata repositories maintained by various data management applications operating within, or outside of, an organization. That is, the virtual metadata approach provides access that appears to the user as if all information is stored in the same repository while enabling access of the source metadata directly from its physical location in a source metadata repository. Accordingly, no copying of the source metadata into a central repository is needed and the data presented to a user is up-to-date.

Further, the user is allowed to define extended metadata that provides additional information about source metadata objects (e.g., tables, reports, etc.). This additional information may include, for example, business data (e.g., business rules and end-user requirements), technical data (program specifications) and organizational data (e.g., employee rosters). Based on user input, extended metadata is created and stored in an extended metadata repository. The extended metadata may include extended metadata objects associated with source metadata objects and independent extended metadata objects. In one embodiment, a series of user interfaces is provided to assist users in the creation of customized extended metadata. These user interfaces are designed for use by non-technical users and allow a company to tailor its metadata repositories for the company's exact needs. No changes to source metadata are required when creating extended metadata objects.

In one embodiment, relationships between source metadata objects are defined. The relationships may be defined for source metadata objects residing in the same source metadata repository (intra relationships) or in different source metadata repositories (inter relationships). In one embodiment, the relationships are specified by a user. In another embodiment, the relationships are inferred from the metadata by comparing attributes of source metadata objects.

In one embodiment, in which a single point is provided for user access to source metadata, a user is enabled to view, via this single access point, the source metadata residing in multiple source metadata repositories and the extended metadata residing in the extended metadata repository. Specifically, the user is presented with a user interface displaying current information about source metadata objects residing in the source metadata repositories and extended metadata objects residing in the extended metadata repository and is allowed to request further information about these objects individually. In one embodiment, the information about the currently stored metadata is displayed in the form of a tree illustrating a hierarchical structure of the source metadata and extended metadata. The information about the currently stored metadata is repeatedly obtained from the data management applications and the extended metadata repository. In one embodiment, the information about the currently stored metadata is obtained every time the user issues a request pertaining to one or more of the source metadata objects. The user may issue a request by, for example, expanding a specific node of the tree (e.g., a request to view children of a specific source metadata object), selecting a specific node (e.g., a request to view metadata of a specific source metadata object), etc.

In one embodiment, a mechanism referred to herein as dynamic metadata referencing is used to obtain current information about source metadata objects and associated extended metadata objects. A dynamic metadata referencing module enables real-time access to the source metadata maintained by the data management applications. Specifically, in response to a user request pertaining to one or more source metadata objects, a data management application associated with the user-specified source metadata object is identified and the requested information is obtained from the data management application using a corresponding application program interface (API). In one embodiment, if the user-specified source metadata object is associated with an extended metadata object, the dynamic metadata referencing module also retrieves the extended metadata object from the extended metadata repository. The two objects are then combined and returned for presentation to the user. As will be discussed in more detail below, a synchronization process may also be performed to trace possible changes that could have occurred in the source metadata repository since the previous access of this repository by the dynamic metadata referencing module. If any change is detected, it is reflected in the information presented to the user (e.g., by changing a node's location in the tree).

In one embodiment, the dynamic metadata referencing module is used to perform a search of metadata objects stored by data management applications in various data storage formats (e.g., a database, a file, a document, etc.) for a user-specified keyword or phrase.

In some embodiments, the dynamic metadata referencing module is used to perform analytical tasks (e.g., impact analysis, data lineage, repository comparison, mapping view analysis), as will be discussed in greater detail below.

Virtual Metadata Repository

FIG. 1 is a block diagram of one embodiment of a system 100 for managing metadata residing in various information sources. System 100 includes a virtual metadata repository platform 102 coupled to various data management applications. The data management applications may operate within an organization or outside of the organization. The data management applications may include, for example, any combination of business intelligence (BI) tools, data integration tools, data modeling tools, database management systems (DBMS), enterprise resource planning (ERP) tools, customer relationship management (CRM) tools, enterprise application integration (EAI) tools, supply chain management (SCM) tools, and any other tools that maintain collections of metadata. Each data management application maintains a source metadata repository 110 that stores source metadata that may define other data (e.g., transactional data) processed by the data management application. A source metadata repository 110 may be a database, an XML file, a flat file, a document, or any other organized collection of data.

The virtual metadata repository platform 102 may reside on a distributed network and be coupled to the data management applications on that network. The network may be any private network (e.g., LAN, Intranet, etc.) or any public network (e.g., Internet, wireless network, etc.). Alternatively, the virtual metadata repository 102 may reside on the same machine as some or all of the data management applications.

In one embodiment, the virtual metadata repository 102 may also communicate with various client devices 112 via a private or public network. Client devices 112 may represent any devices that may enable user's access to data. Such devices may include, for example, a conventional computer system, a network computer or thin client device (e.g., WebTV Networks™ Internet terminal or Oracle™ NC), a laptop or palm-top computing device (e.g., Palm Pilot™), etc. Client devices ("clients") 112 use client application programs 110 to access graphical and textual data or video, audio, or tactile data provided by the virtual metadata repository platform 102. The client application programs 110 are known as browsers (e.g., the Netscape™ Navigator™, the Internet Explorer™, the user interface of America On-Line™, the wireless application platform (WAP) browser, etc.). The users of clients 112 may be business analysts, software developers, repository administrators, members of operations staff or any other personnel of the organization.

The virtual metadata repository platform 102 facilitates management of the entire metadata residing in multiple source metadata repositories 110 by providing a single access point from which clients 112 may browse, search, associate and analyze the source metadata residing in multiple source metadata repositories 110. In addition, the virtual metadata repository platform 102 integrates the source metadata with extended metadata 106 residing in various other sources within the organization or outside the organization. This extended metadata 106 may reside in various files and may include, for example, business data (e.g., business rules and end-user requirements), technical data (program specifications) and organizational data (e.g., employee rosters). The virtual metadata repository platform 102 maintains an extended metadata repository which may physically store portions of the extended metadata 106 and/or include pointers to portions of the extended metadata 106 stored outside of the extended metadata repository (e.g., in a file on a local hard drive or a network, in a web page, etc.). The extended metadata may be associated with the source metadata (e.g., extended metadata fields for a source metadata table) or be independent of the source metadata (e.g., a dictionary).

Figure 2:
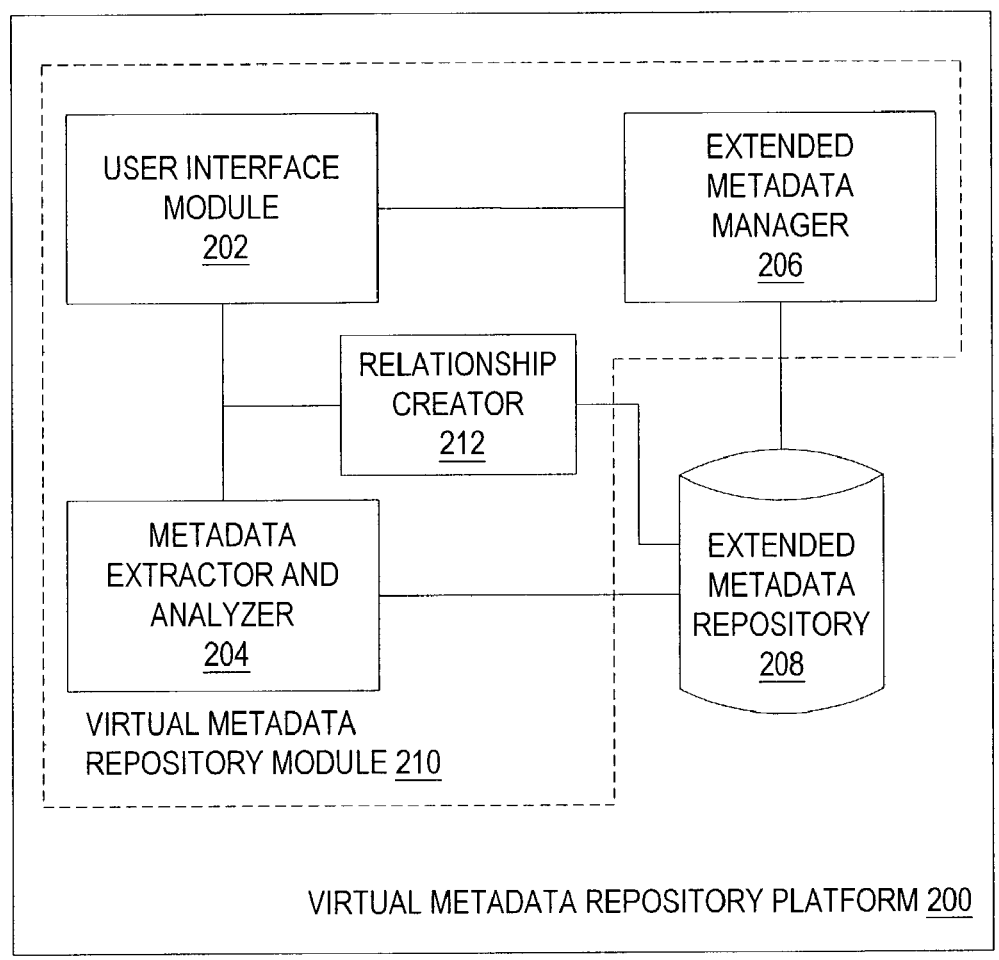
FIG. 2 is a block diagram of one embodiment of a virtual metadata repository platform.

FIG. 2 is a block diagram of one embodiment of a virtual metadata repository platform 200. The platform 200 includes a virtual metadata repository module 210 and an extended metadata repository 208.

The virtual metadata repository module 210 is responsible for providing a single, unified view of the source metadata residing in the source metadata repositories 110 and the extended metadata stored in the extended metadata repository 208. The virtual metadata repository module 210 includes a user interface module 202, a metadata extractor and analyzer 204, a relationship creator 212, and an extended metadata manager 206. The user interface module 202 is responsible for generating a user interface displaying information about the currently stored source metadata and extended metadata and identifying user requests pertaining to metadata objects displayed on the screen. In one embodiment, the user interface module 202 presents the information about the currently stored metadata in the form of a tree illustrating the hierarchical structure of the source metadata and the extended metadata. Each node of the tree represents a specific metadata object. The user may issue a request pertaining to one or more metadata objects by, for example, expanding a node, selecting a node, etc. In other embodiments, the information about the currently stored metadata may be presented in any other form (e.g., a cascade view).

The metadata extractor and analyzer 204 are responsible for obtaining information about the currently stored source metadata and extended metadata. In one embodiment, the information about the currently stored metadata is obtained in real time in response to a user request pertaining to one or more metadata objects. Alternatively, the information about the currently stored source metadata may be obtained periodically (e.g., every 2 seconds).

Once the information about the currently stored source metadata is obtained, it is passed to the user interface module 202 for presentation to the users.

In one embodiment, the metadata extractor and analyzer 204 obtains the information about the currently stored source metadata using the dynamic metadata referencing technique that will be discussed in more detail below. Alternatively, any other technique capable of obtaining current metadata information from the repositories in which it is stored in real time can be used.

The relationship creator 212 is responsible for defining relationships between source metadata objects. The relationships may be defined for source metadata objects residing in the same source metadata repository (intra relationships) or in different source metadata repositories (inter relationships). In one embodiment, the relationships are defined based on user input. In another embodiment, the relationships are inferred based on comparison of attributes of source metadata objects that is performed by the metadata extractor and analyzer 204. In one embodiment, the relationship information (e.g., identifiers of related source metadata objects and identifiers of corresponding relationship types) is stored in the extended metadata repository 208.

In one embodiment, the user interface module 202 is also responsible for generating user interfaces assisting the users in the definition of customized extended metadata. Exemplary user interfaces will be described in greater detail below in conjunction with FIGS. 4A-4C. The extended metadata manager 206 creates extended metadata objects based on the user input and stores them in the extended metadata repository 208. An extended metadata object may be associated with a specific source metadata object(s) or may be independent from the source metadata. If an extended metadata object is associated with one or more source metadata objects, the extended metadata manager 206 creates the association information. In one embodiment, the association information is created by assigning a local identifier (ID) to the corresponding source metadata object(s) and referencing this local ID to the ID of the extended metadata object.

In one embodiment, only the source metadata objects that have associated extended metadata objects and/or the source metadata objects associated with each other are assigned local IDs. In another embodiment, each source metadata object retrieved by the metadata extractor and analyzer 204 is assigned a local ID.

Figure 3:
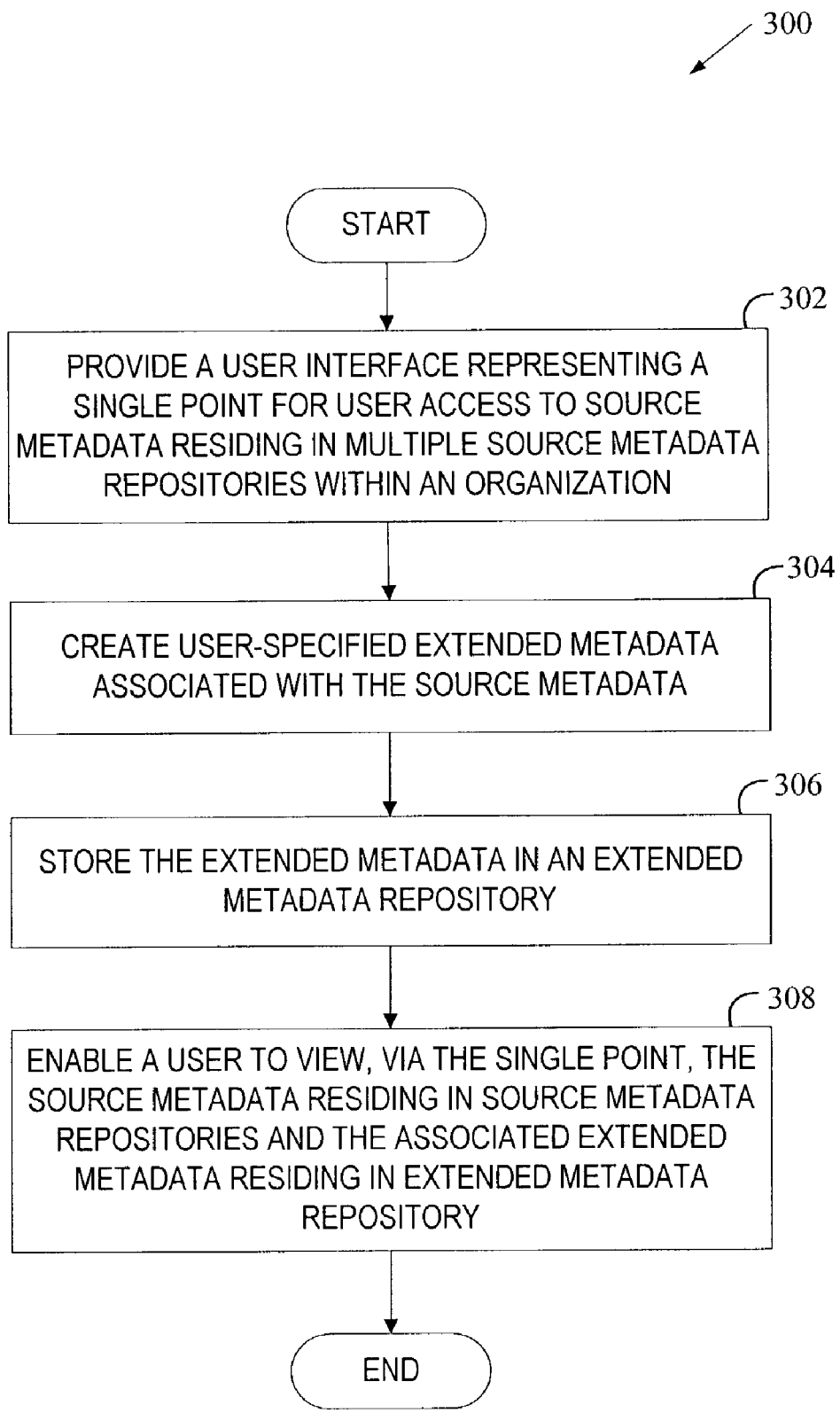
FIG. 3 is a flow diagram of one embodiment of a process for managing metadata residing in various information sources within an organization.

FIG. 3 is a flow diagram of one embodiment of a process 300 for managing metadata residing in various information sources. The process may be performed by processing logic that may comprise hardware (e.g., circuitry, dedicated logic, etc.), software (such as run on a general purpose computer system or a dedicated machine), or a combination of both.

Referring to FIG. 3, process 300 begins at processing block 302 with processing logic providing a user interface representing a single point for user access to source metadata residing in multiple source metadata repositories that are maintained by various data management applications (e.g., BI tools, ETL tools, DBMS catalogs, ERP tools, CRM tools, data modeling tools, EAI tools, SCM tools, etc.). The user interface presents current information about source metadata objects within the source metadata. In one embodiment, the current information is in the form of a tree illustrating the hierarchical structure of the source metadata.

At processing block 304, processing logic creates user-specified extended metadata associated with the source metadata. The extended metadata includes extended one or more metadata objects containing additional information about corresponding source metadata objects. In one embodiment, the extended metadata is created by defining user-specified attributes (e.g., data fields to store textual data, numeric data, images, multimedia clips, links to external objects, etc.) for corresponding source metadata objects and inserting data into the attributes in response to user requests. In another embodiment, the extended metadata is created by defining user-specified extended metadata groups and objects (e.g., tables, report templates, documents, files, etc.), creating user-specified attributes for the extended metadata objects, and inserting data into the attributes in response to user requests. The extended metadata objects may or may not be associated with specific source metadata objects.

Once the extended metadata is created, it is stored in an extended metadata repository (processing block 306).

At processing block 308, processing logic enables the users to view, via the single access point, the source metadata stored in the source metadata repositories and the associated extended metadata residing in the extended metadata repository. This view is provided by a user interface presenting information about the currently stored source metadata objects and associated extended metadata objects. The user can then request further information pertaining to any metadata objects. Once processing logic receives the user request, it retrieves in real time the requested source metadata from corresponding source metadata repositories and/or extended metadata from the extended metadata repository.

In one embodiment, processing logic also creates relationships between source metadata objects stored in the same repositories and/or different repositories. The relationships may be created based on user input or inferred based on comparison of attributes of source metadata objects.

FIGS. 4A-4F show exemplary user interfaces generated by the virtual metadata repository module 210.

Figure 4A:
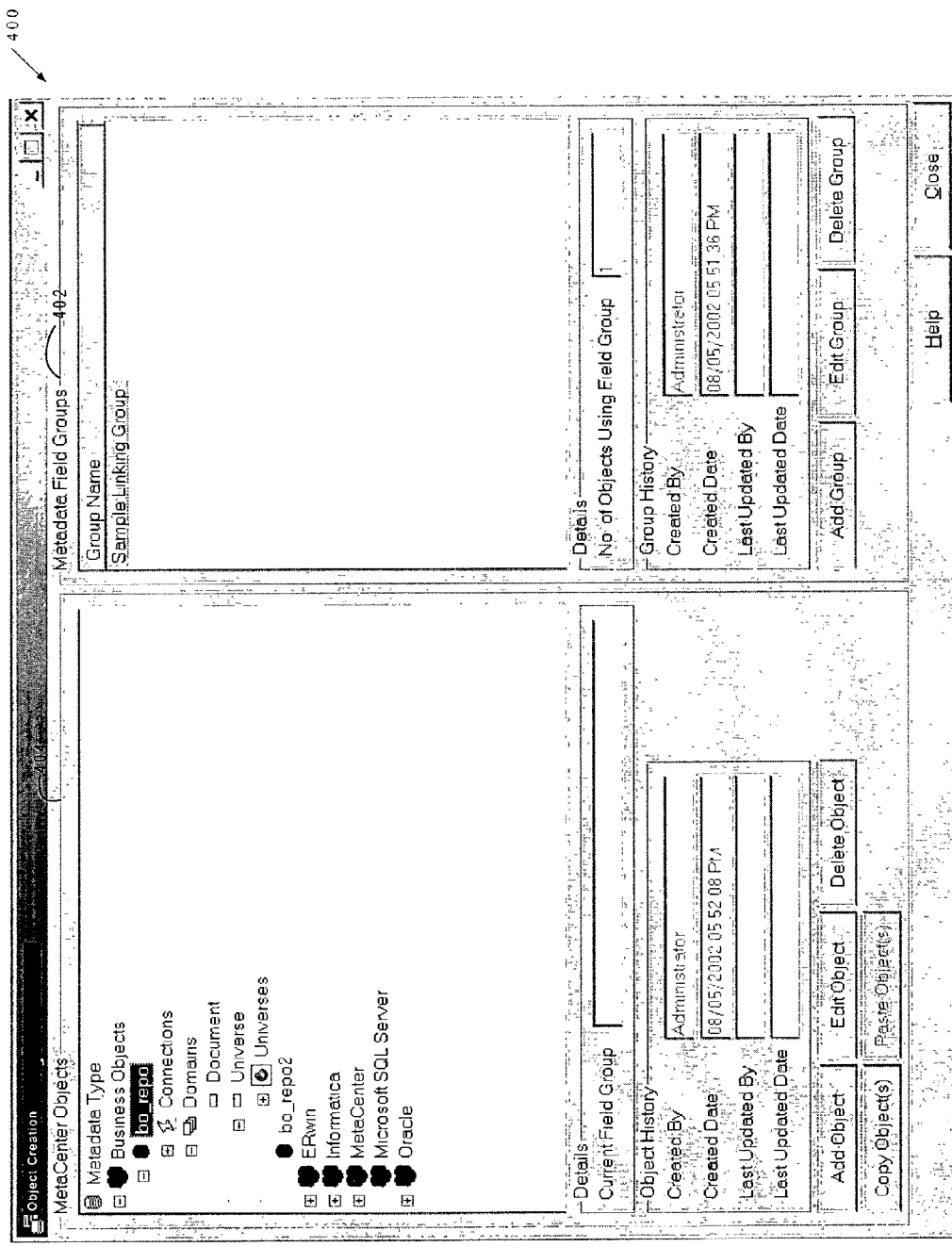

Referring to FIG. 4A, a user interface 400 enables users to create custom defined extended metadata objects 404 and object groups 402. Newly created extended metadata objects and object groups are added to the tree illustrating their relationships with other groups and objects.

Figure 4B:
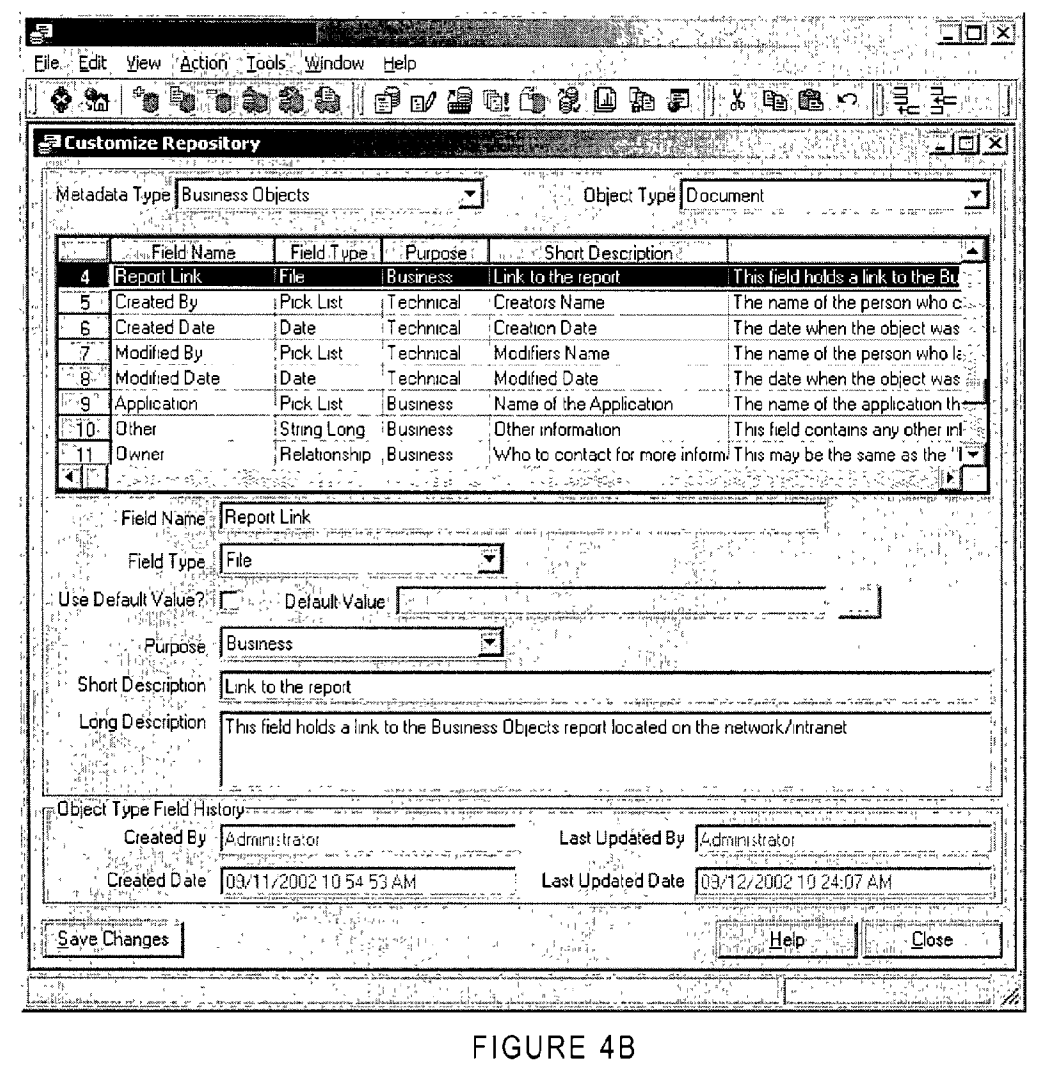

FIG. 4B illustrates a user interface allowing users to define attributes (e.g., data fields) for existing source metadata objects and extended metadata objects. Data fields may be customized specifically for an individual data type such as a database table or globally for all objects. Customized fields may be used to provide links to external applications or objects on the network, thus enabling distributed access to documents, databases, spreadsheets and reports.

Figure 4C:
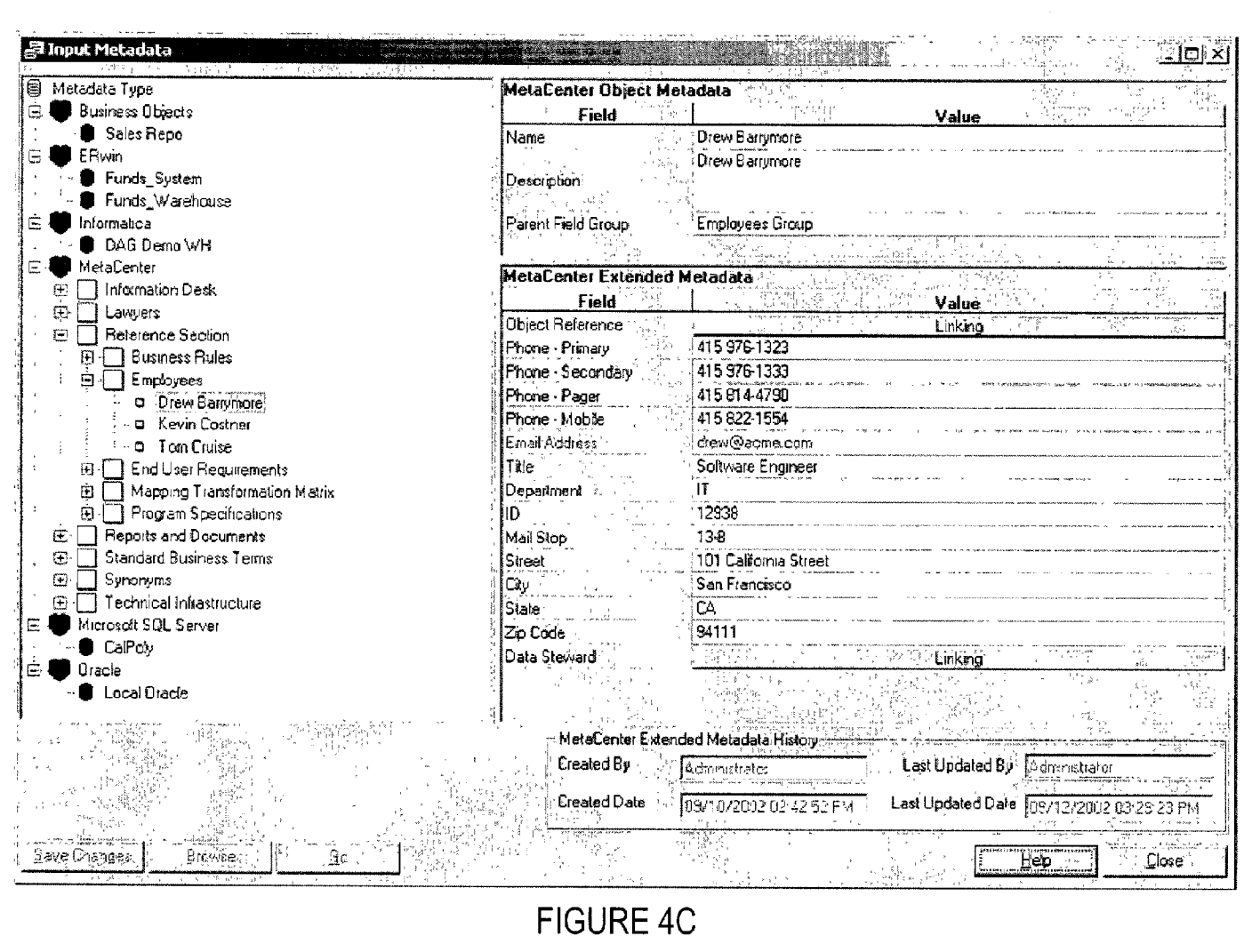

FIG. 4C illustrates an input metadata user interface facilitating user input of data into the created data fields. The input metadata interface assists the user while data is input based upon the column's data type. The user may also choose to import metadata stored in other formats such as spreadsheets or text files into a data field or to enter the same value into the fields of multiple objects.

Figure 4D:
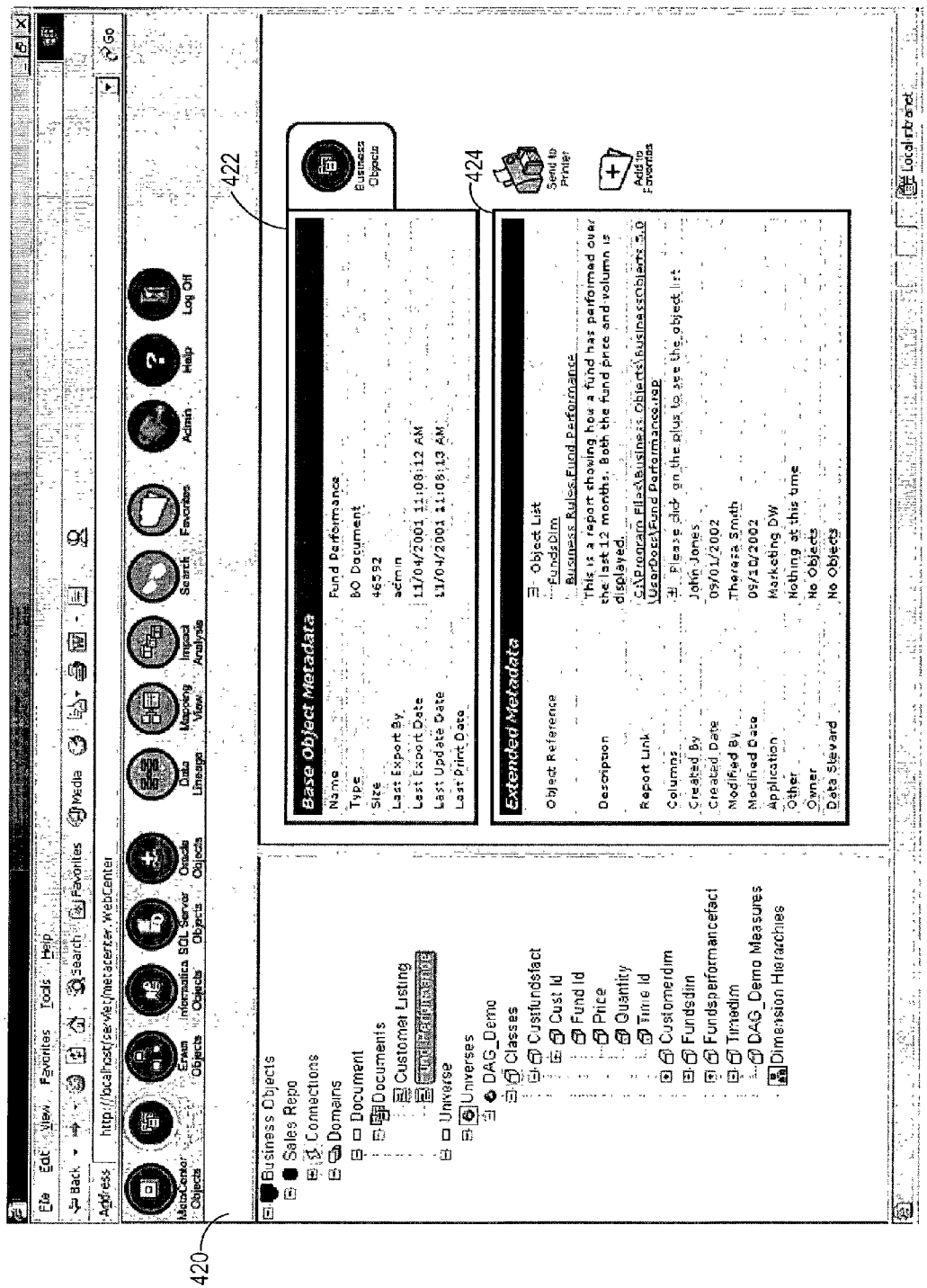

FIG. 4D illustrates a user interface representing a single point for user access to disparate source of metadata within the organization. The presentation of the metadata objects in a tree structure 420 allows the users to quickly browse through hierarchies of objects in an organized and logical manner. If the user selects a specific object, a combination of the object's source metadata 422 and extended metadata 424 is displayed.

Figure 4E:
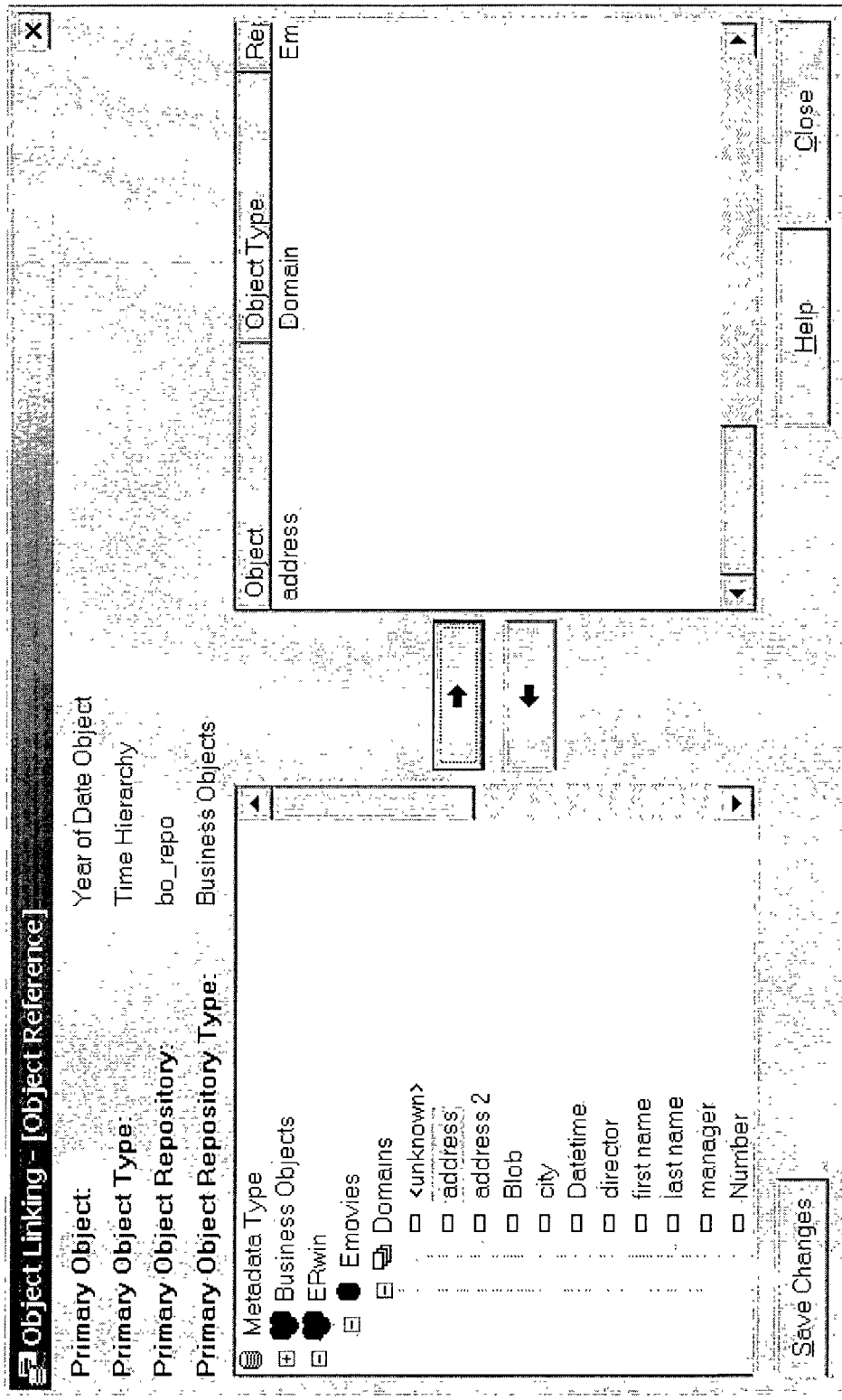

FIG. 4E illustrates an object linking interface facilitating user definition of relationships between source metadata objects.

Figure 4F:
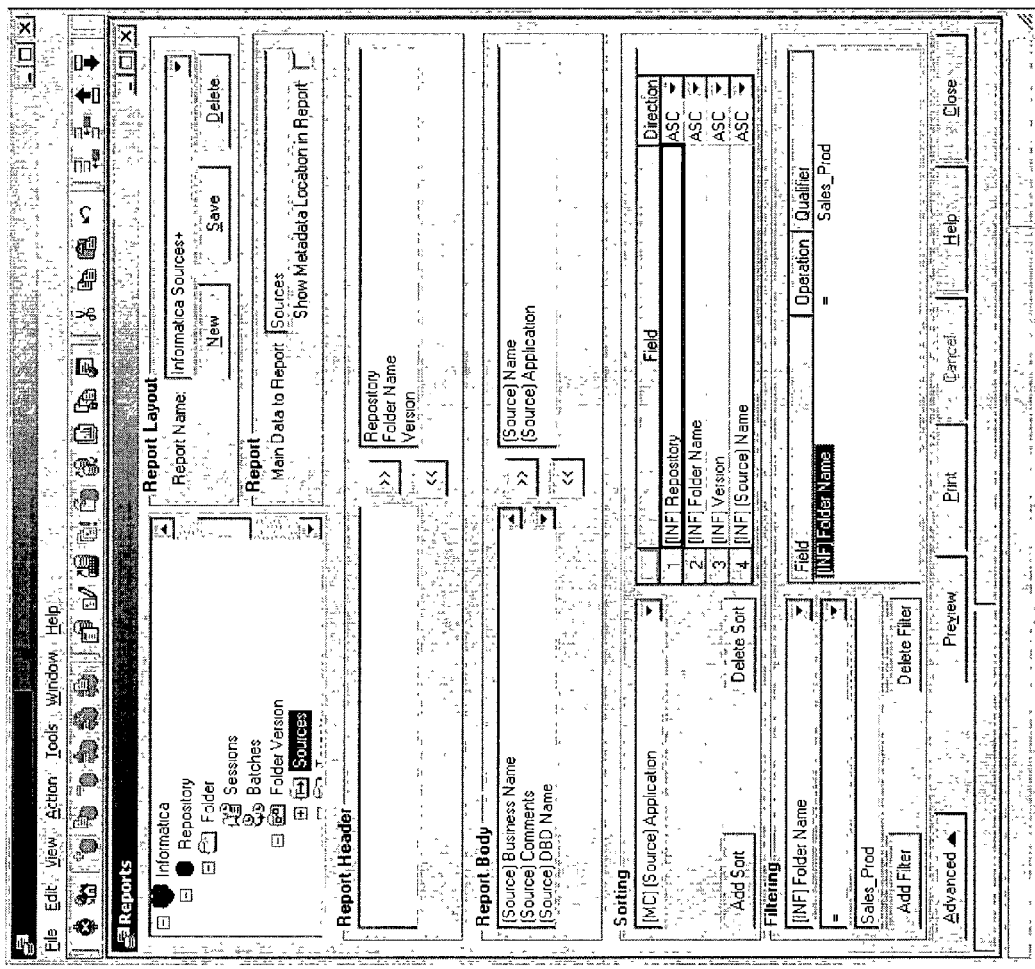

FIG. 4F illustrates a reporting user interface for assisting users in creating a new report or customizing a predefined report template. Both the source metadata and the extended metadata may be used for the report.

Dynamic Metadata Referencing Technique

Figure 5:
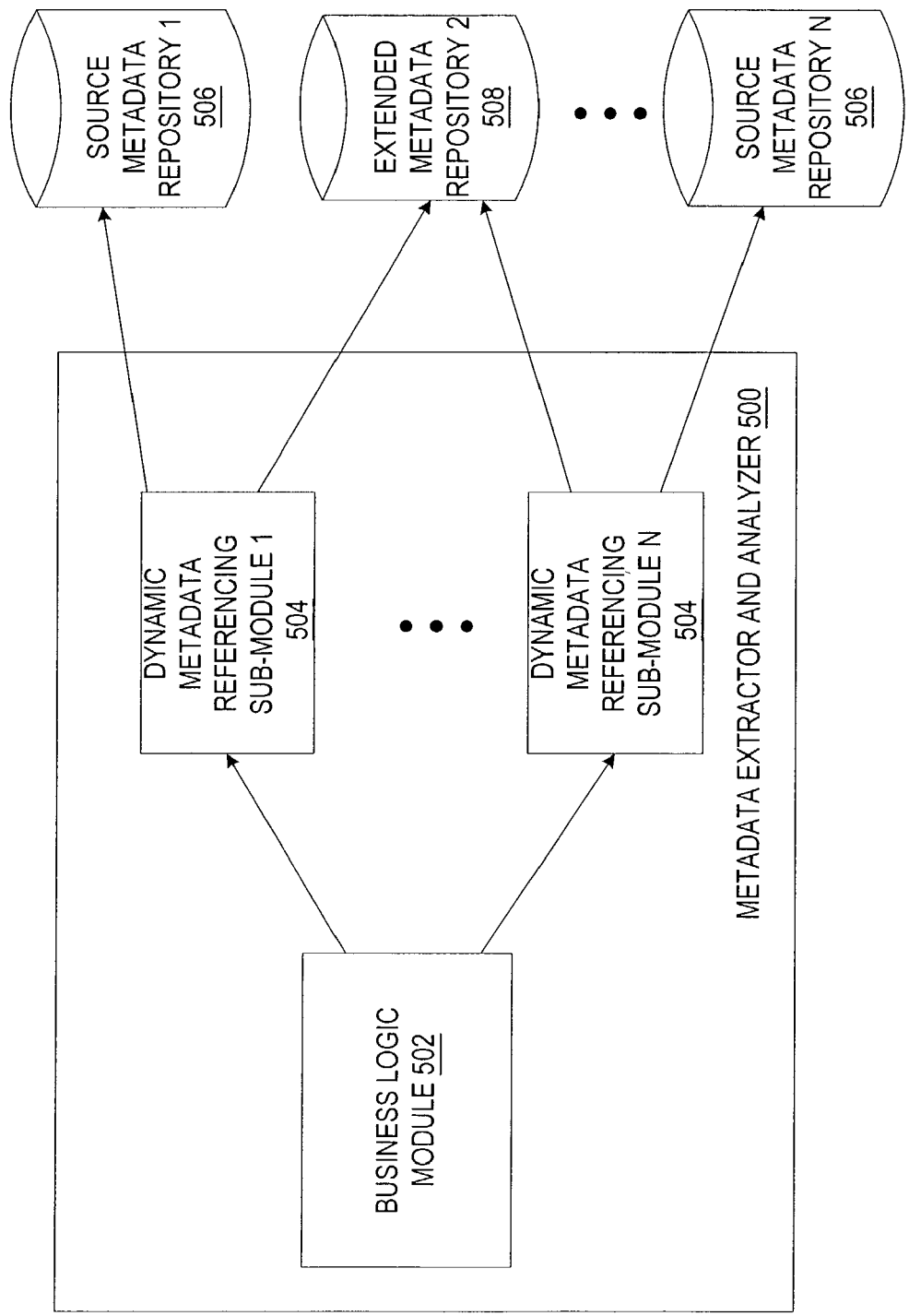
FIG. 5 is block diagram of one embodiment of a metadata extractor that utilizes the active links technique.

FIG. 5 is a block diagram of one embodiment of a metadata extractor and analyzer 500 using the dynamic metadata referencing technique. The metadata extractor and analyzer 500 includes a business logic module 502 and a dynamic metadata referencing module. In one embodiment, the dynamic metadata referencing module includes a set of dynamic metadata referencing sub-modules 504. Each dynamic metadata referencing sub-module 504 is associated with a specific type of a source metadata repository 506 and is programmed to understand the underlying schema or data structure of this repository type. In one embodiment, each dynamic metadata referencing sub-module 504 supports a specific data management application. Alternatively, each dynamic metadata referencing sub-module 504 supports a specific structure of the source metadata repository 506 (e.g., sub-module 1 may be designated to support databases, sub-module 2 may be designated to support XML files, etc.).

The business logic module 502 is responsible for receiving a user request pertaining to one or more metadata objects and analyzing the request to determine the type of the request. In other words, the business logic module 502 determines which information the user expects to receive. For example, if the user has expanded a tree branch representing a parent object, the user may expect to see the information about this parent object's children; if the user selected a tree node representing a specific source metadata object, the user may expect to see this object's source metadata and extended metadata, etc. In addition, the business logic module 502 is responsible for identifying a data management application from which the requested metadata objects are to be retrieved and for selecting a dynamic metadata referencing sub-module 504 associated with this data management application. The business logic module 502 passes the user request with the information identifying the type of the user request to the selected dynamic metadata referencing sub-module 504.

The dynamic metadata referencing sub-module 504 is responsible for determining whether the requested metadata objects are source metadata objects or extended metadata objects. If they are extended metadata objects, the dynamic metadata referencing sub-module 504 retrieves them from the extended metadata repository 508 and returns to the business logic module 502. For source metadata objects, the dynamic metadata referencing sub-module 504 retrieves extended metadata objects associated with the source metadata objects from the extended metadata repository 508 if they exist. In addition, the dynamic metadata referencing sub-module 504 interfaces the corresponding data management application using designated APIs and accesses this application's source metadata repository 506 to obtain requested source metadata objects. The API may be provided by the data management application or defined by the virtual metadata repository platform 200. Next, the dynamic metadata referencing sub-module 504 combines the source metadata objects with the extended metadata objects retrieved from the extended metadata repository 508 and returns the combined metadata to the business logic module 502.

In one embodiment, the dynamic metadata referencing sub-module 504 is also responsible for synchronizing the retrieved extended metadata objects and source metadata objects. The synchronization process will be discussed in greater detail below in conjunction with FIGS. 6B and 6C. If during the synchronization process, the dynamic metadata referencing sub-module 504 detects a change in the source metadata stored in repository 506 that occurred after its previous access of the repository 506, the dynamic metadata referencing sub-module 504 informs the business logic module 502 about the change. The business logic module 502 passes the requested metadata to the user interface module that displays the requested metadata. In one embodiment, the business logic module 502 also passes the information about the change to the user interface module that updates the tree to reflect the change.

Figure 6A:
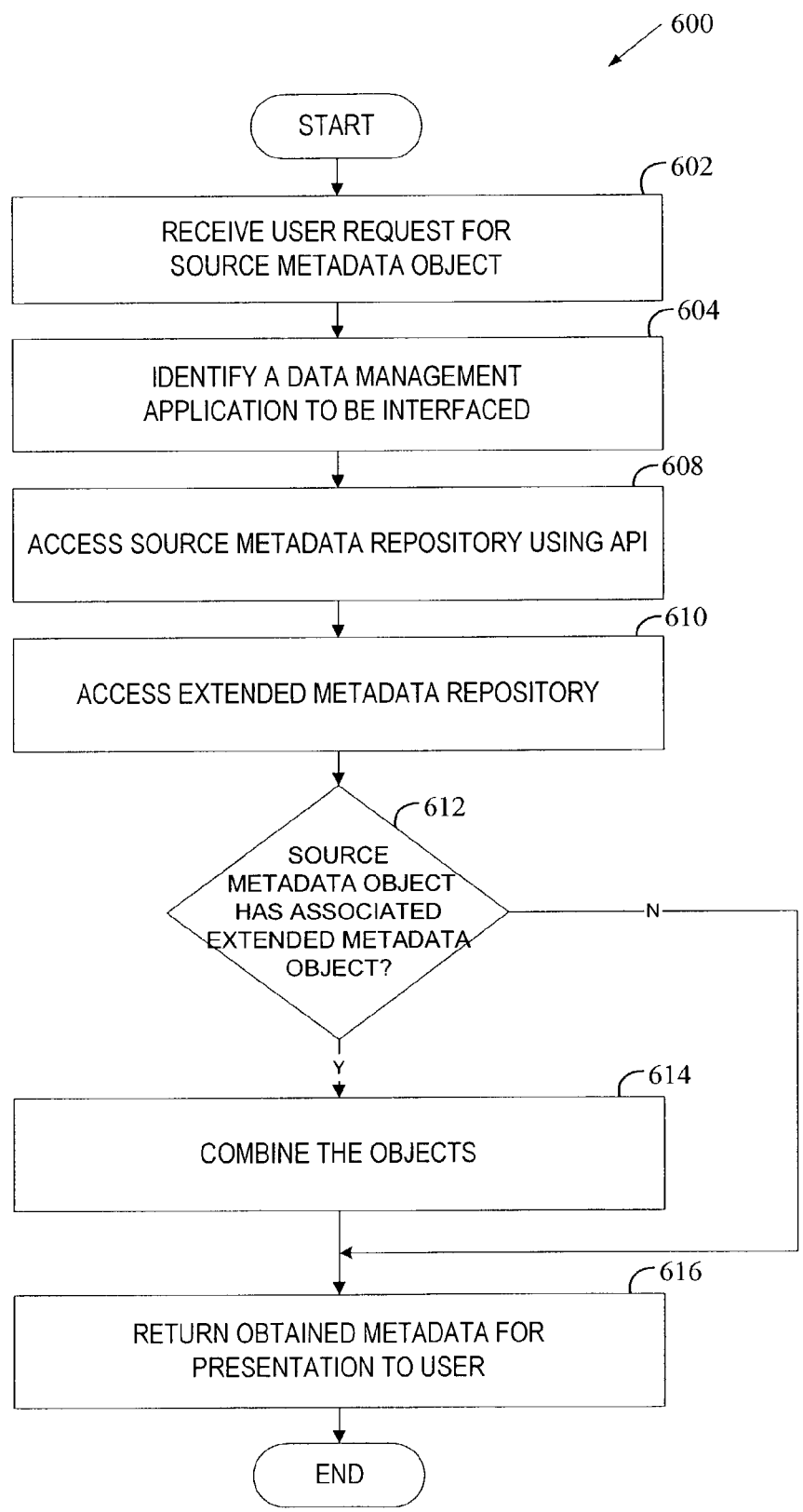
FIGS. 6A and 6B are flow diagrams of two alternative embodiments of a process for obtaining requested metadata from one of multiple data management applications.
Figure 6B:
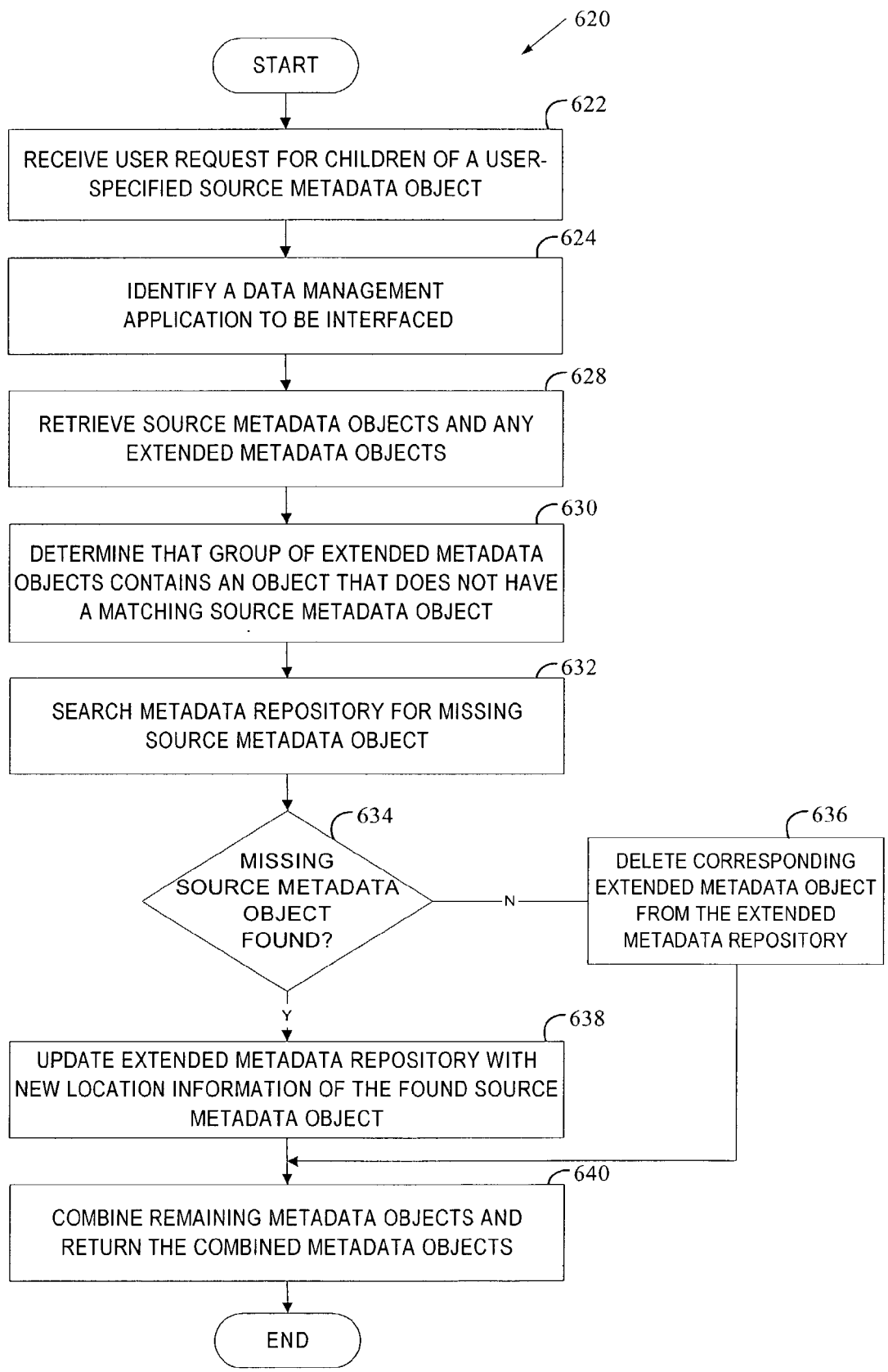

FIGS. 6A and 6B are flow diagrams of two alternative embodiments of a process for obtaining requested metadata from one of multiple data management applications. The process may be performed by processing logic that may comprise hardware (e.g., circuitry, dedicated logic, etc.), software (such as run on a general purpose computer system or a dedicated machine), or a combination of both.

Referring to FIG. 6A, process 600 begins at processing block 602 with processing logic receiving a user request pertaining to a specific source metadata object such as a request for information about a database table or a report. Next, processing logic identifies a data management application that is to be interfaced to retrieve the requested information (processing block 604).

Further, processing logic accesses a source metadata repository of the identified data management application using designated APIs (processing block 608) and an extended metadata repository (processing block 610). Based on retrieved data, processing logic determines whether the retrieved source metadata object is associated with any extended metadata objects. If the determination is negative, processing logic returns the retrieved source metadata for presentation to the user (processing block 616). Otherwise, processing logic combines the retrieved source metadata and extended metadata (processing block 614), and returns the combined metadata for presentation to the user (processing block 616).

Referring to FIG. 6B, process 620 begins at processing block 622 with processing logic receiving a user request for children of a user-specified source metadata object. Next, processing logic identifies a data management application that is to be interfaced to retrieve the requested information (processing block 624).

At processing block 628, processing logic retrieves children of the user-specified source metadata objects using an API with the identified data management application and any associated extended metadata objects from the extended metadata repository.

Next, processing logic compares the group of retrieved extended metadata objects with the group of retrieved source metadata objects and detects that an object from the extended metadata group contains an object that does not have a matching source metadata object in the source metadata group (processing block 630). Processing logic then searches the source metadata maintained by the identified data management application for a missing source metadata object (processing block 632).

If the missing source metadata object is not found (decision box 634), then processing logic decides that the missing source metadata object was deleted from the source metadata. Accordingly, processing logic deletes the extended metadata object that does not have a matching source metadata object from the extended metadata repository (processing block 636).

If the missing source metadata object is found (decision box 634), then processing logic decides that the missing source metadata object was moved to a new location within the source metadata (e.g., became a child of a different parent). Then, processing logic updates the information stored in the extended metadata repository to reflect the new location of the source metadata object (processing block 638). This update may reflect that the extended metadata object whose matching source metadata object was moved is now associated with a source metadata object at a new location. In one embodiment, processing logic also returns the information identifying the new location of the moved source metadata object that will then be reflected when presenting the current metadata information to the user.

At processing block 640, processing logic combines the remaining metadata objects and returns the combined metadata objects for presentation to the user (processing logic 640).

Figure 6C:
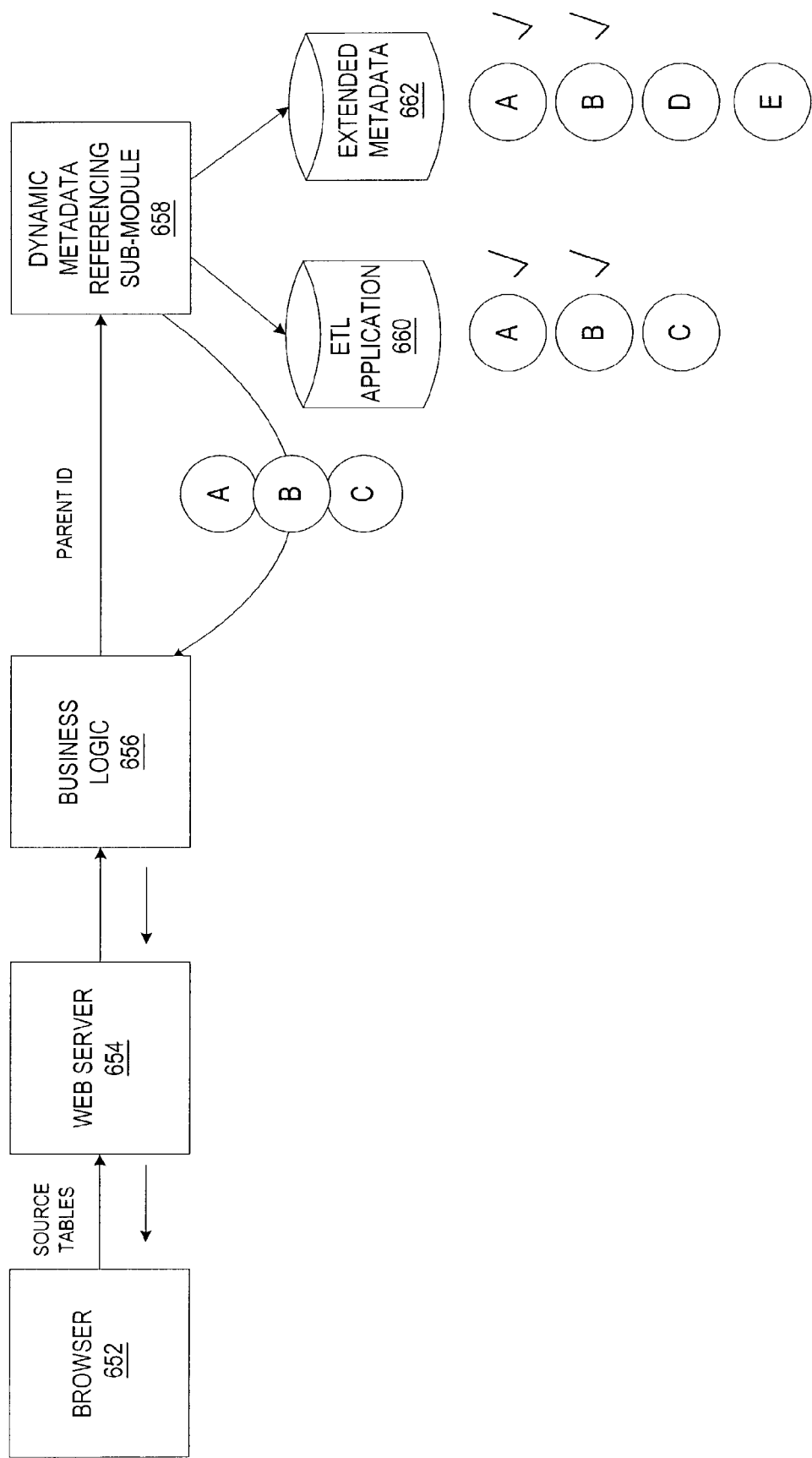
FIG. 6C is a block diagram of one embodiment of a process flow for obtaining requested metadata objects residing in one of multiple data management applications.

FIG. 6C is a block diagram of one embodiment of a process flow for obtaining requested metadata objects residing in one of multiple data management applications.

Referring to FIG. 6C, a user expands a tree branch representing a source tables group of an ETL tool, causing a browser 652 to issue a request for source tables. A web server 654 receives the request and transfers it to a business logic module 656. The business logic module 656 evaluates a request, determines that the repository to be queried is the ETL repository 660 and passes the information about the request to a dynamic metadata referencing sub-module 658. The information about the request asks the dynamic metadata referencing sub-module 658 to return the children (e.g., source tables) of a specified parent ID (e.g., a source table group).

The dynamic metadata referencing sub-module 658 retrieves children A, B and C from the ETL repository 660 using real-time interfaces as discussed above. In addition, the dynamic metadata referencing sub-module 658 retrieves children A, B, D and E from the extended metadata repository 662. Because children D and E have no matching children in the ETL list, the dynamic metadata referencing sub-module 658 searches the ETL repository 660 for these objects and detects that they are no longer present in the ETL repository 660. The dynamic metadata referencing sub-module 658 then deletes children D and E from the extended metadata repository 662, combines ETL object A with extended metadata object A and ETL object B with extended metadata object B, and returns combined objects A and B and ETL object C to the business logic module 656.

In one embodiment, the dynamic metadata referencing technology is used to perform various analytical tasks. The analytical tasks may be also based on inferred relationships (inter-relationships and intra-relationships) between the metadata objects that are identified by comparing attributes of the metadata objects as discussed in greater detail above.

Figure 7:
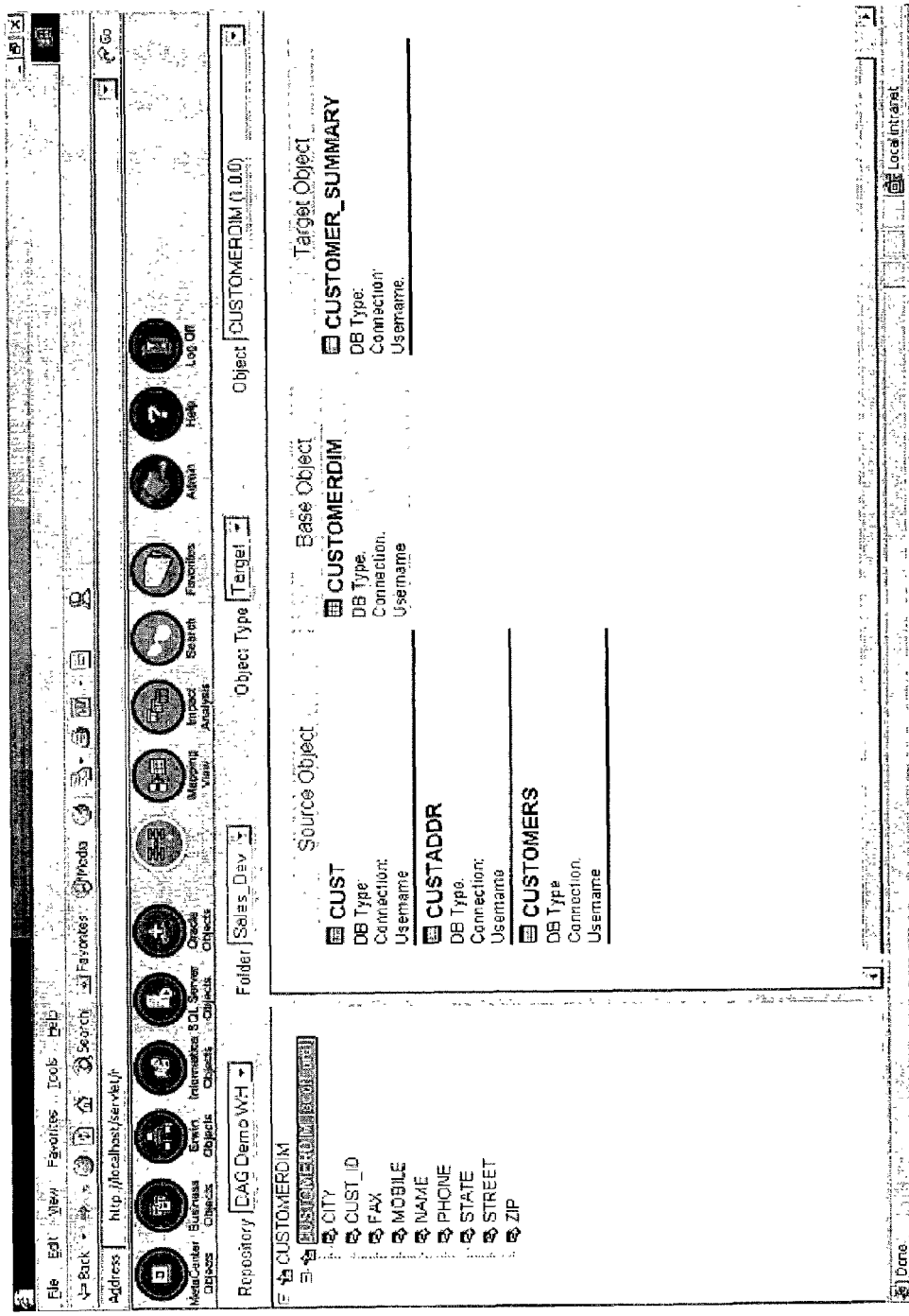
FIG. 7 illustrates an exemplary data lineage report.

One example of an analytical task is a data lineage of a particular metadata object (i.e., to illustrate physical data flow with respect to a particular metadata object). Specifically, in response to a user request for an object's lineage, a dynamic metadata referencing sub-module accesses a source metadata repository of a corresponding data management application to determine relationships between the user-specified metadata object and other metadata objects. Based on these relationships and relationships specified by the user, dynamic metadata referencing sub-module identifies metadata objects from which data flows to the user-specified metadata object and metadata objects to which data flows from the user-specified metadata object. This information is then used to generate a data lineage report. FIG. 7 illustrates an exemplary data lineage report for metadata object CUSTOMERDIM.

Figure 8:
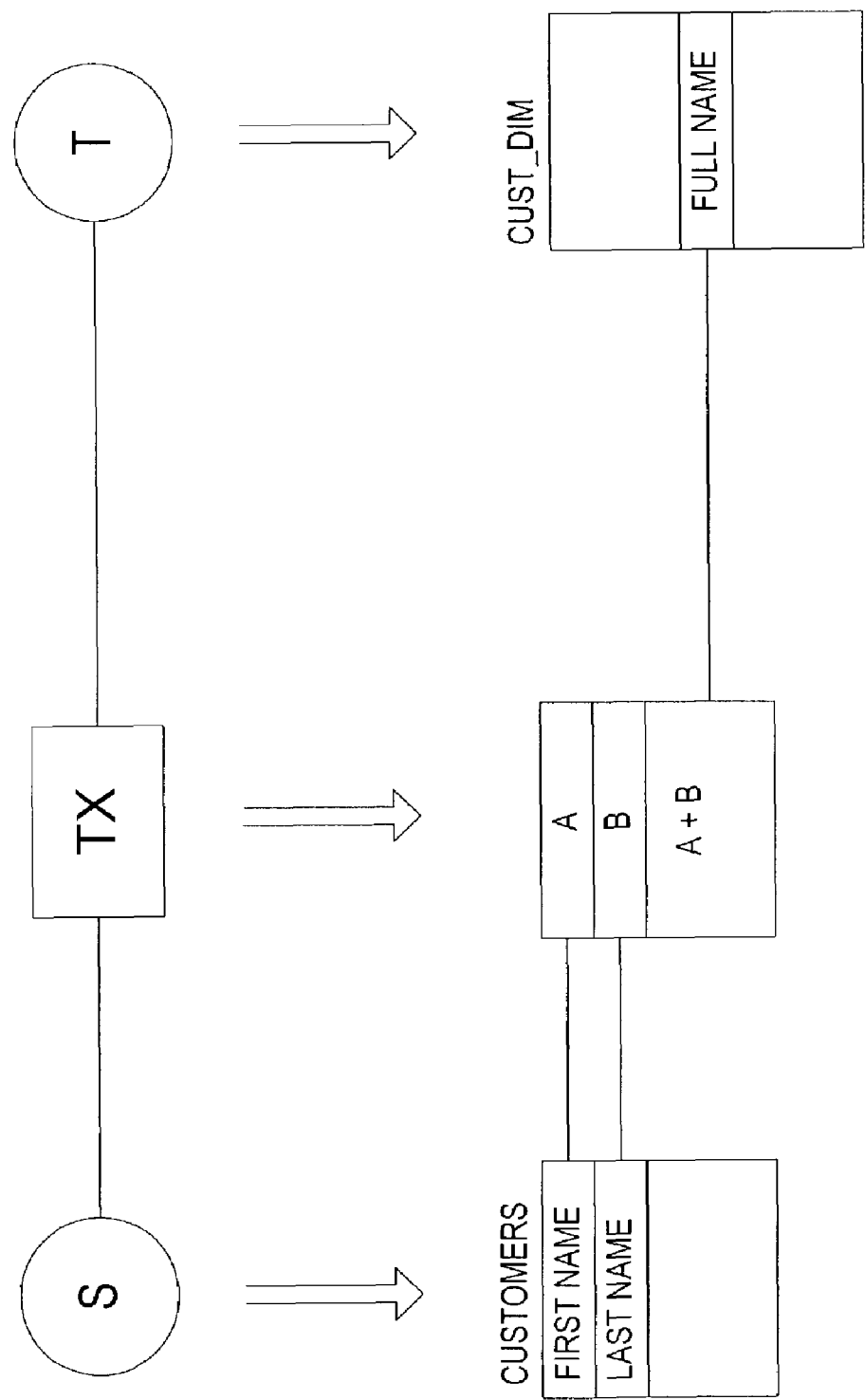
FIG. 8 illustrates an exemplary mapping view report.

Another example of an analytical task is a mapping view for a certain metadata object (i.e., a map of data manipulations with respect to a certain metadata object). Specifically, in response to a user request for an object's mapping view, a dynamic metadata referencing sub-module accesses a source metadata repository of a corresponding data management application to determine relationships between the user-specified metadata object and other metadata objects and then identifies prior transformations of data stored in the user-specified object. Based on this information, a mapping view report is generated. FIG. 8 illustrates an exemplary mapping view report showing that field FULL NAME of table CUST_DIM receives data which is a combination of fields FIRST NAME and LAST NAME of table CUSTOMERS.

Figure 9:
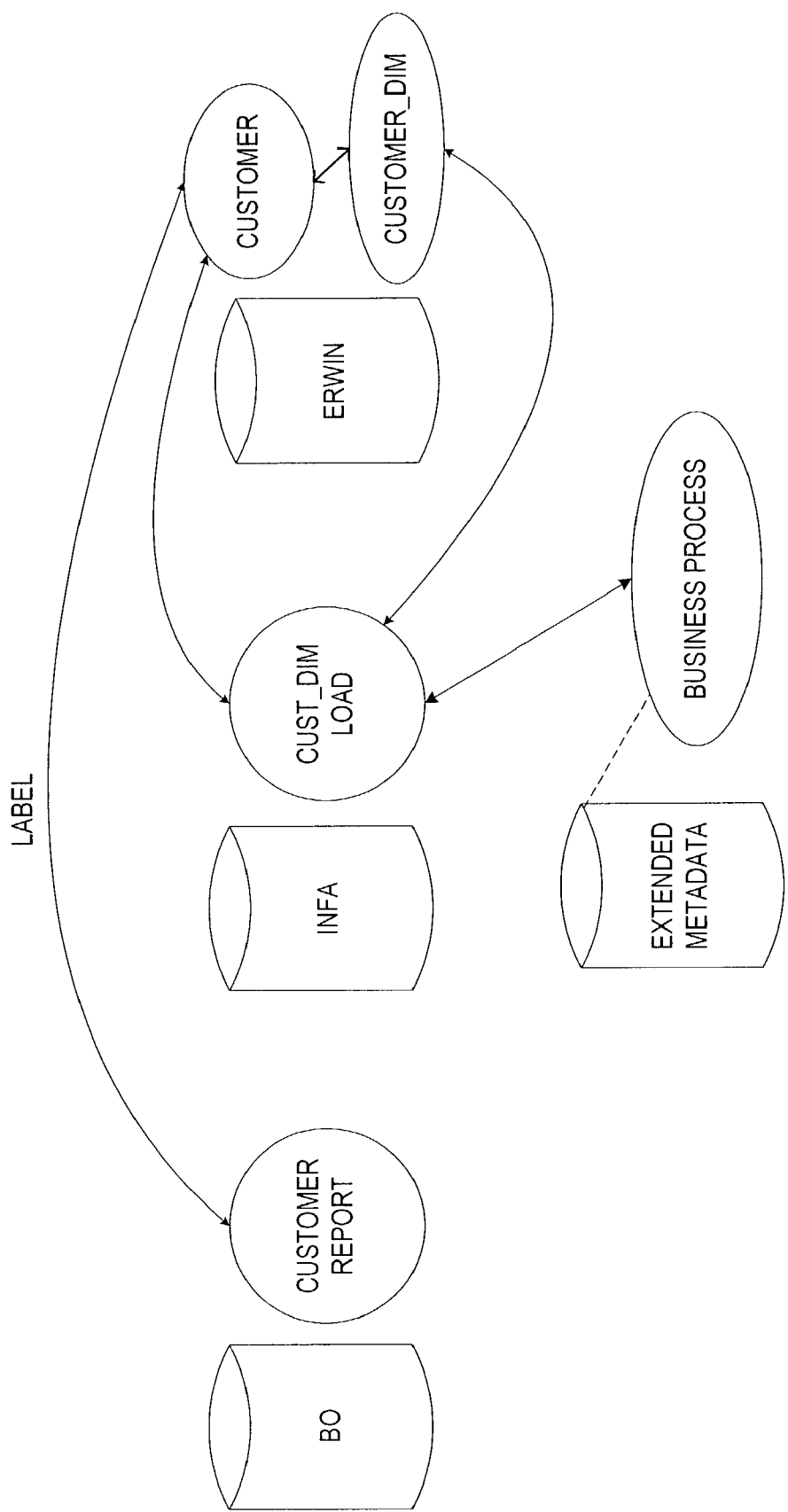
FIG. 9 illustrates an exemplary impact analysis report.

Yet another example of an analytical task is an impact analysis report that allows users to analyze the dependencies of objects from the same repository or different repositories. Specifically, in response to a user request for an impact analysis report for a specific metadata object, a dynamic metadata referencing sub-module accesses a source metadata repository of a corresponding data management application and obtains information on metadata objects that are dependent on the user-specified metadata object. This information is then combined with information identifying relationships of the object with objects from other source metadata repositories. FIG. 9 illustrates an exemplary impact analysis report for table CUSTOMER showing its internal relationship to CUSTOMER_DIM and external relationships with metadata objects from other repositories. In one embodiment, each link between the objects may have a label indicating the type of their relationship (e.g., a foreign key).

Figure 10:
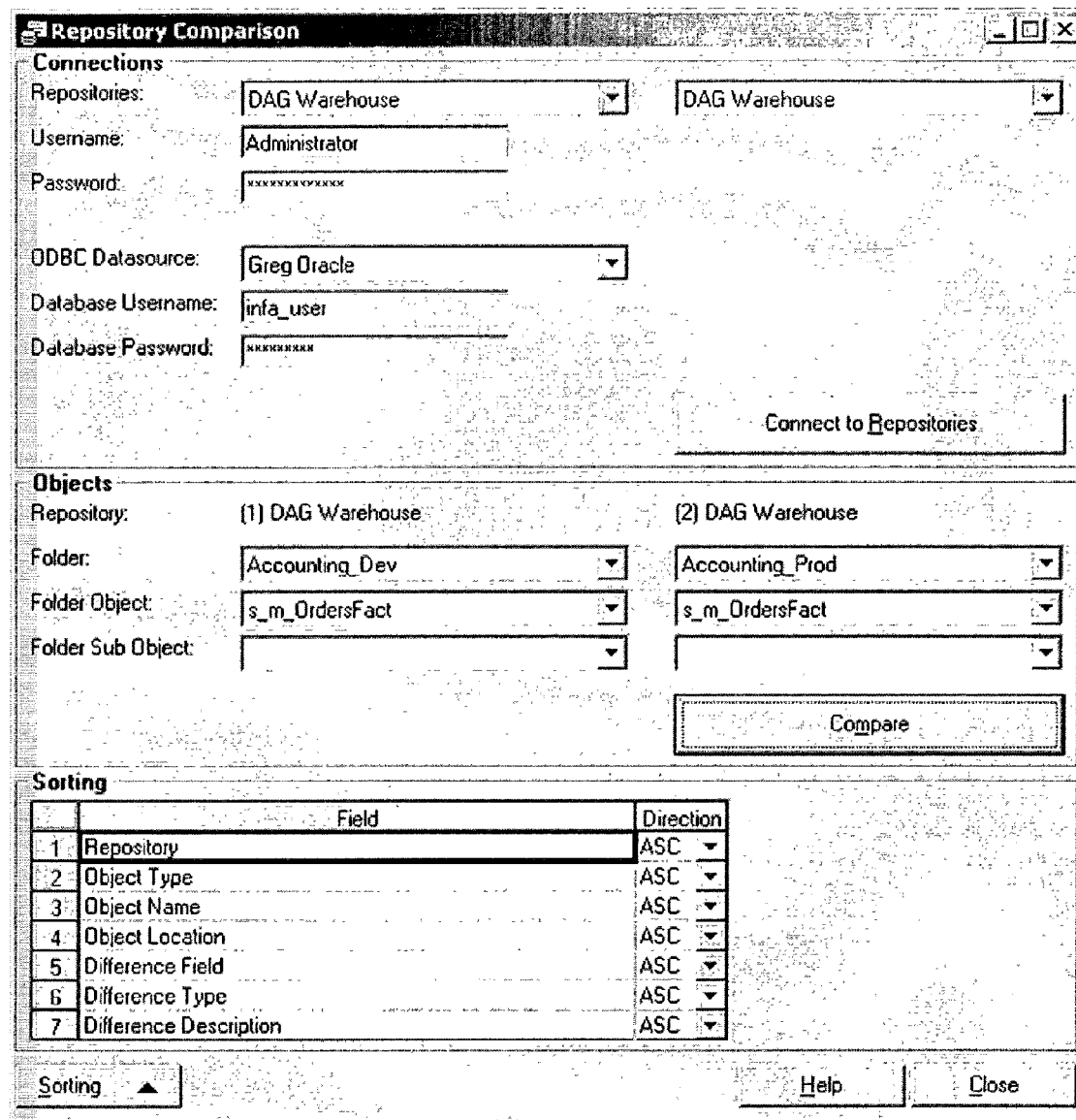
FIG. 10 illustrates an exemplary user interface for requesting a repository comparison report.

In one embodiment, the dynamic metadata referencing technology is used to compare repositories to identify differences between the repositories. Certain objects or groups of objects can be compared for any conflict and an analysis report is generated detailing the results. Specifically, in response to a user request for a repository comparison report for a specific object, one or more dynamic metadata referencing sub-modules access the repositories and obtain information about the specified object. This information is then compared and the differences between the two objects are identified. The conflicts may be classified as either business (e.g., when the same object has dissimilar descriptions) or technical (e.g., differing column sizes) depending on their impact on the system components. The reports may highlight for immediate detection technical conflicts that can significantly impact the information system. FIG. 10 illustrates an exemplary user interface for requesting a repository comparison report.

Figure 11:
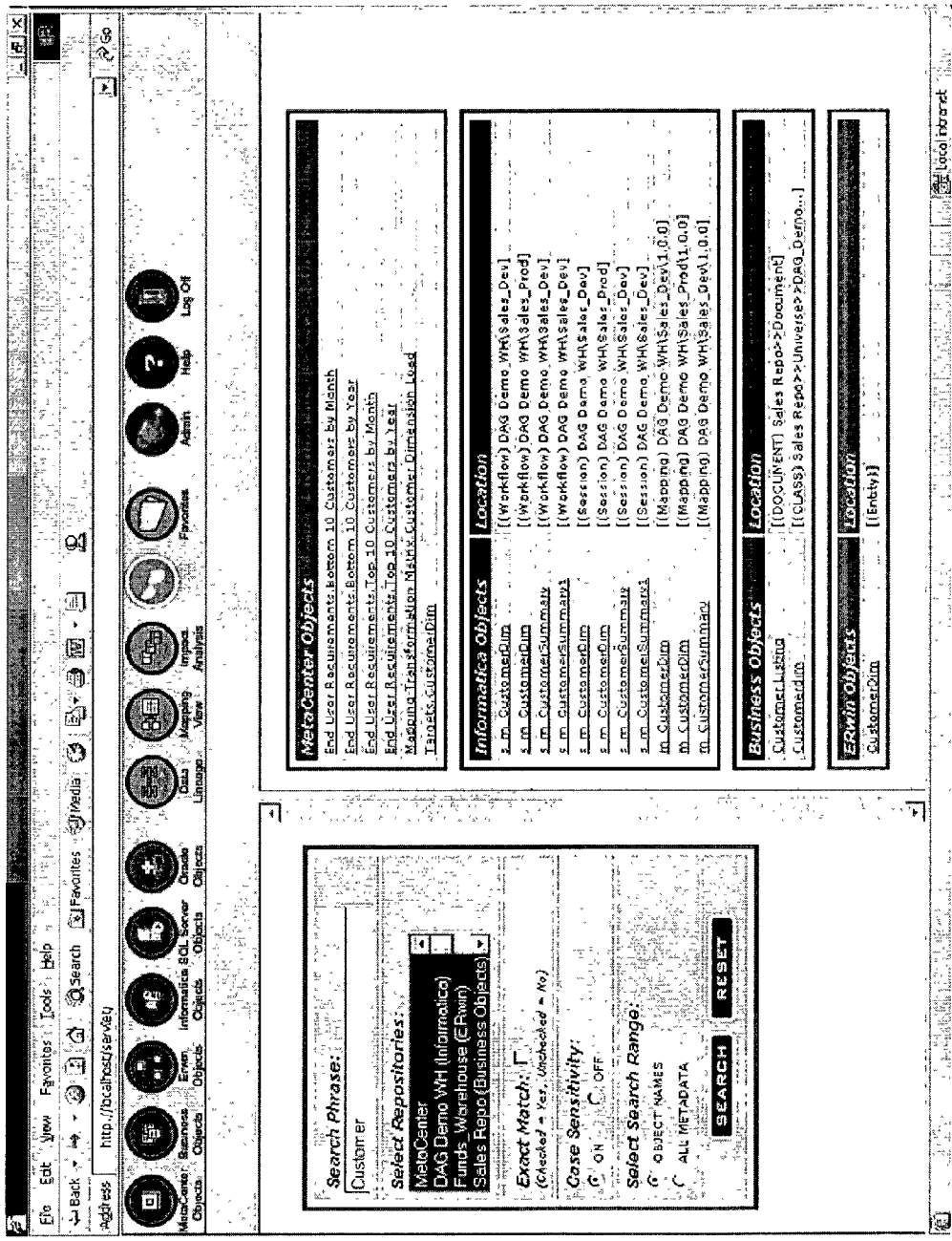
FIG. 11 illustrates an exemplary search report.

In one embodiment, the dynamic metadata referencing technology is used to search stored metadata objects (e.g., stored procedures, views, reports, functions, etc.) for a user-specified keyword, phrase or Boolean combinations thereof. Specifically, in response to a user request for a search of specific repositories, one or more dynamic metadata referencing sub-modules access specified repositories and search stored metadata objects as metadata attributes for keywords. The search results from different repositories are then combined. FIG. 11 illustrates an exemplary search report for keyword "customer".

In one embodiment, the search feature is optimized by storing indexes for different keywords in a cache. Upon a user request for a search with a specific keyword, the cache is first checked for an existing index for this keyword or phrase. If the index is found, the object is returned if it is still a valid object as determined by a corresponding dynamic metadata referencing sub-module.

An Exemplary Computer System

Figure 12:
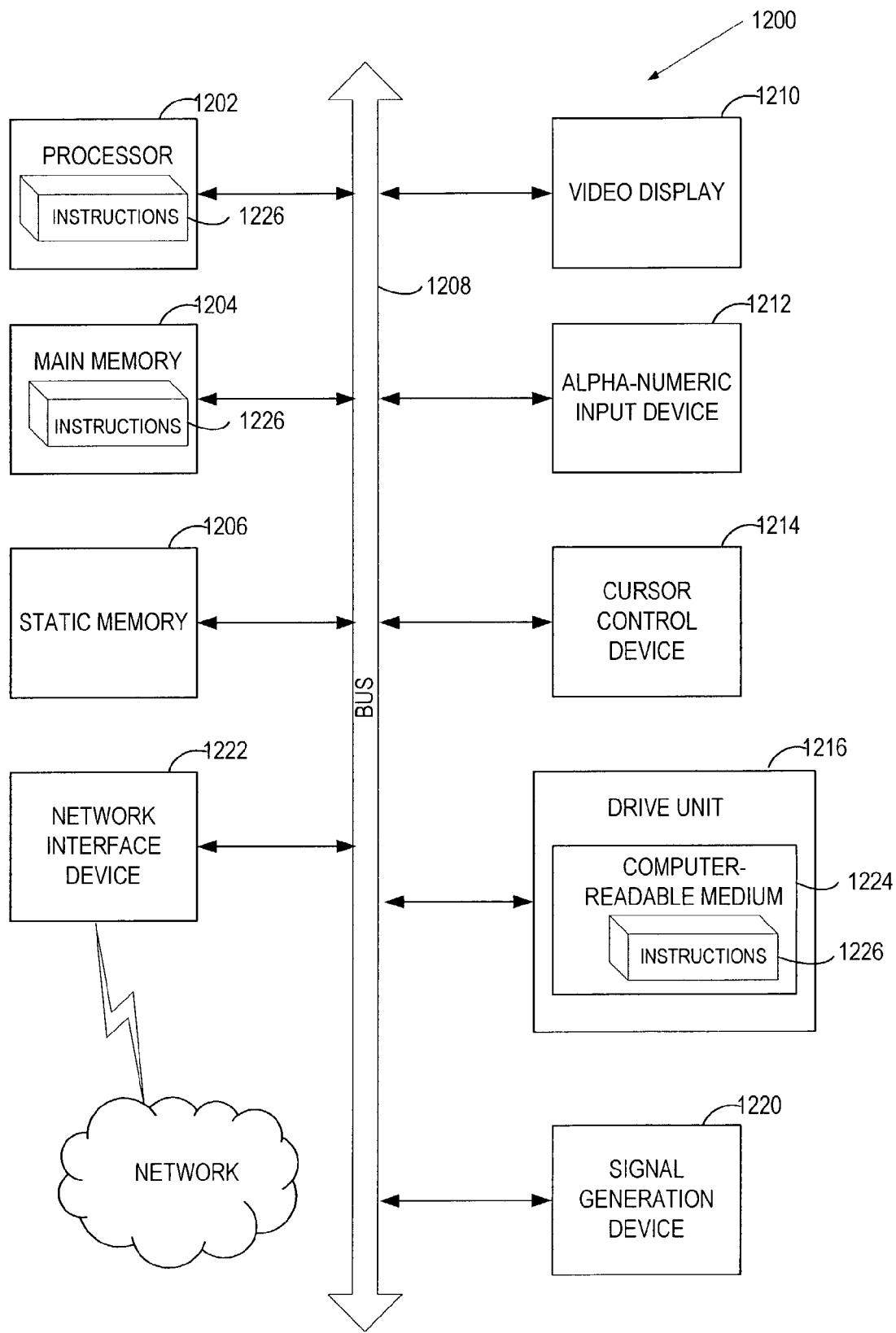
FIG. 12 is a block diagram of an exemplary computer system.

FIG. 12 is a block diagram of an exemplary computer system 1200 that may be used to perform one or more of the operations described herein. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 1200 includes a processor 1202, a main memory 1204 and a static memory 1206, which communicate with each other via a bus 1208. The computer system 1200 may further include a video display unit 1210 (e.g., a liquid crystal display (LCD) or a cathode ray tube (CRT)). The computer system 1200 also includes an alpha-numeric input device 1212 (e.g., a keyboard), a cursor control device 1214 (e.g., a mouse), a disk drive unit 1216, a signal generation device 1220 (e.g., a speaker) and a network interface device 1222.

The disk drive unit 1216 includes a computer-readable medium 1224 on which is stored a set of instructions (i.e., software) 1226 embodying any one, or all, of the methodologies described above. The software 1226 is also shown to reside, completely or at least partially, within the main memory 1204 and/or within the processor 1202. The software 1226 may further be transmitted or received via the network interface device 1222. For the purposes of this specification, the term "computer-readable medium" shall be taken to include any medium that is capable of storing or encoding a sequence of instructions for execution by the computer and that cause the computer to perform any one of the methodologies of the present invention. The term "computer-readable medium" shall accordingly be taken to included, but not be limited to, solid-state memories, and optical and magnetic disks.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A computer implemented method comprising:

receiving a user request pertaining to source metadata objects residing in a plurality of source metadata repositories within an organization, the plurality of source metadata repositories being maintained by a plurality of different data management applications; and in response to the user request, analyzing the user request to determine which of the source metadata objects a user expects to view, identifying one of the plurality of different data management applications that corresponds to the expected source metadata objects, and retrieving the expected source metadata objects using an application program interface (API) with the corresponding data management application, wherein the user request is a request for one or more source metadata objects that are dependent on a user-specified source metadata object, and retrieving the expected source metadata objects comprises:

retrieving one or more source metadata objects that are dependent on the user-specified source metadata object from a corresponding source metadata repository based on internal relationships between the plurality of source metadata objects, and retrieving source metadata objects that are dependent on the user-specified source metadata object from any other source metadata repository based on external relationships between the plurality of source metadata objects.

2. The method of claim 1 wherein the plurality of different data management applications comprises at least one of a business intelligence tool, a data integration tool, a data modeling tool, a database management system (DBMS), an enterprise resource planning (ERP) tool, an enterprise application integration (EAI) tool, supply chain management (SCM) tool, and a customer relationship management (CRM) tool.

3. The method of claim 1 further comprising:

determining that the expected source metadata objects are associated with one or more of a plurality of extended metadata objects retrieved from an extended metadata repository; and combining the retrieved source metadata objects with the retrieved extended metadata objects for presentation to a user.

4. The method of claim 1 wherein each of the plurality of extended metadata objects contains additional information about corresponding expected source metadata objects.

5. The method of claim 3 further comprising synchronizing the retrieved source metadata objects with the retrieved extended metadata objects to detect a change in source metadata maintained by the corresponding data management application.

6. The method of claim 5 further comprising:

reflecting the detected change when presenting current information about the plurality of source metadata objects to the user.

7. The method of claim 5 wherein synchronizing the retrieved source metadata objects with the retrieved extended metadata objects comprises:

determining that one of the retrieved extended metadata objects does not have a matching source metadata object within the retrieved source metadata objects;

searching the source metadata maintained by the identified data management application for a missing source metadata object that would match the one of the retrieved extended metadata objects to determine whether the missing source metadata object has been moved to a new location within the source metadata; and if the missing source metadata object is not found, deleting the extended metadata object that does not have a matching source metadata object from the extended metadata repository.

8. The method of claim 7 further comprising:

determining that the missing metadata object has been moved to a new location; and updating the extended metadata repository to reflect that the missing metadata object has been moved to a new location.

9. The method of claim 8 further comprising returning information identifying the new location of the missing metadata object, the new location being subsequently reflected when presenting current information about the plurality of source metadata objects to the user.

10. A computer implemented method comprising:

receiving a user request pertaining to source metadata objects residing in a plurality of source metadata repositories within an organization, the plurality of source metadata repositories being maintained by a plurality of different data management applications; and in response to the user request, analyzing the user request to determine which of the source metadata objects a user expects to view, identifying one of the plurality of different data management applications that corresponds to the expected source metadata objects, and retrieving the expected source metadata objects using an application program interface (API) with the corresponding data management application, wherein the user request is a request for data flow with respect to a user-specified source metadata object; and retrieving the expected source metadata objects includes retrieving one or more source metadata objects from which data flows to the user-specified source metadata object; and retrieving one or more source metadata objects to which data flows from the user-specified source metadata object.

11. A computer implemented method comprising:

receiving a user request pertaining to source metadata objects residing in a plurality of source metadata repositories within an organization, the plurality of source metadata repositories being maintained by a plurality of different data management applications; and in response to the user request, analyzing the user request to determine which of the source metadata objects a user expects to view, identifying one of the plurality of different data management applications that corresponds to the expected source metadata objects, and retrieving the expected source metadata objects using an application program interface (API) with the corresponding data management application, wherein the user request is a request for a map for data manipulations with respect to a user-specified source metadata object; and retrieving the expected source metadata objects includes
retrieving one or more source metadata objects from which data flows to the user-specified source metadata object;
retrieving one or more source metadata objects to which data flows from the user-specified source metadata object; and
obtaining information on occurring data manipulations during the data flow.

12. The method of claim 1 wherein:
the user request is a request for expected source metadata objects that contain a user specified keyword.

13. The method of claim 12 wherein the expected source metadata objects comprise at least one of a stored procedure, a view, a trigger, a report, and a function.

14. An computer implemented apparatus comprising:
a business logic module to receive a user request pertaining to source metadata objects residing in a plurality of source metadata repositories within an organization, the plurality of source metadata repositories being maintained by a plurality of different data management applications, to analyze the user request to determine which of the source metadata objects a user expects to view, and to identify one of the plurality of data management applications that corresponds to the expected source metadata objects; and
a dynamic metadata referencing module to retrieve, in response to the user request, the expected source metadata objects using an application program interface (API) with the corresponding data management application,
wherein the user request is a request for one or more source metadata objects that are dependent on a user-specified source metadata object, and the dynamic metadata referencing module is to retrieve the expected source metadata objects by
retrieving one or more source metadata objects that are dependent on the user-specified source metadata object from a corresponding source metadata repository based on internal relationships between the plurality of source metadata objects, and
retrieving source metadata objects that are dependent on the user-specified source metadata object from any other source metadata repository based on external relationships between the source metadata objects.

15. The apparatus of claim 14 wherein each of the plurality of data management applications is any one of a business intelligence tool, a data integration tool, a data modeling tool, a database management system (DBMS), an enterprise resource planning (ERP) tool, an enterprise application integration (EAI) tool, supply chain management (SCM) tool, and a customer relationship management (CRM) tool.

16. The apparatus of claim 14 wherein the dynamic metadata referencing module is further to determine that the expected source metadata objects are associated with one or more of a plurality of extended metadata objects retrieved from an extended metadata repository, and to combine the retrieved source metadata objects with the retrieved extended metadata objects for presentation to a user.

17. The apparatus of claim 14 wherein each of the plurality of extended metadata objects contains additional information about corresponding one or more expected source metadata objects.

18. The apparatus of claim 16 wherein the dynamic metadata referencing module is further to synchronize the retrieved source metadata objects with the retrieved extended metadata objects to detect a change in source metadata maintained by the corresponding data management application.

19. The apparatus of claim 18 further comprising a user interface module to reflect the detected change when presenting current information about the source metadata objects to the user.

20. The apparatus of claim 18 wherein the dynamic metadata referencing module is to synchronize the retrieved source metadata objects with the retrieved extended metadata objects by
determining that one of the retrieved extended metadata objects does not have a matching source metadata object within the retrieved source metadata objects,
searching the source metadata maintained by the corresponding data management application for a missing source metadata object that would match the one of the retrieved extended metadata objects to determine whether the missing source metadata object has been moved to a new location within the source metadata, and
if the missing source metadata object is not found,
deleting the extended metadata object that does not have a matching source metadata object from the extended metadata repository.

21. The apparatus of claim 20 wherein the dynamic metadata referencing module is further to determine that the missing metadata object has been moved to a new location, and to update the extended metadata repository to reflect that the missing metadata object has been moved to a new location.

22. The apparatus of claim 21 further comprising to return information identifying the new location of the missing metadata object to the business logic module, the new location being subsequently reflected when presenting current information about the source metadata objects to the user.

23. An computer implemented apparatus comprising:
a business logic module to receive a user request pertaining to source metadata objects residing in a plurality of source metadata repositories within an organization, the plurality of source metadata repositories being maintained by a plurality of different data management applications, to analyze the user request to determine which of the source metadata objects a user expects to view, and to identify one of the plurality of data management applications that corresponds to the expected source metadata objects; and
a dynamic metadata referencing module to retrieve, in response to the user request, the expected source metadata objects using an application program interface (API) with the corresponding data management application, wherein the user request is a request for data flow with respect to a user-specified source metadata object, and the dynamic metadata referencing module is to retrieve the expected source metadata objects by retrieving one or more source metadata objects from which data flows to the user-specified source metadata object, and retrieving one or more source metadata objects to which data flows from the user-specified source metadata object.

24. An computer implemented apparatus comprising:

a business logic module to receive a user request pertaining to source metadata objects residing in a plurality of source metadata repositories within an organization, the plurality of source metadata repositories being maintained by a plurality of different data management applications, to analyze the user request to determine which of the source metadata objects a user expects to view, and to identify one of the plurality of data management applications that corresponds to the expected source metadata objects; and a dynamic metadata referencing module to retrieve, in response to the user request, the expected source metadata objects using an application program interface (API) with the corresponding data management application, wherein the user request is a request for a map for data manipulations with respect to a user-specified source metadata object, and the dynamic metadata referencing module is to retrieve the expected source metadata objects by retrieving one or more source metadata objects from which data flows to the user-specified source metadata object, retrieving one or more source metadata objects to which data flows from the user-specified source metadata object; and obtaining information on occurring data manipulations during the data flow.

25. The apparatus of claim 14 wherein the user request is a request for one or more source metadata objects that contain a user specified keyword.

26. The apparatus of claim 25 wherein the one or more source metadata objects comprise at least one of a stored procedure, a view, a trigger, a report, and a function.

27. A computer implemented system comprising:

means for receiving a user request pertaining to source metadata objects residing in a plurality of source metadata repositories within an organization, the plurality of source metadata repositories being maintained by a plurality of different data management applications;

means for analyzing the user request to determine which of the source metadata objects a user expects to view;

means for identifying one of the plurality of data management applications that corresponds to the expected source metadata objects; and means for retrieving the expected source metadata objects using an application program interface (API) with the corresponding data management application, wherein the user request is a request for one or more source metadata objects that are dependent on a user-specified source metadata object, and the means for retrieving the expected source metadata objects comprises means for retrieving one or more source metadata objects that are dependent on the user-specified source metadata object from a corresponding source metadata repository based on internal relationships between the plurality of source metadata objects, and means for retrieving source metadata objects that are dependent on the user-specified source metadata object from any other source metadata repository based on external relationships between the plurality of source metadata objects.

28. A computer readable medium comprising executable instructions which when executed on a processing system cause said processing system to perform a method comprising:

receiving a user request pertaining to source metadata objects residing in a plurality of source metadata repositories within an organization, the plurality of source metadata repositories being maintained by a plurality of different data management applications; and in response to the user request, analyzing the user request to determine which of the source metadata objects a user expects to view, identifying one of the plurality of different data management applications that corresponds to the expected source metadata objects, and retrieving the expected source metadata objects using an application program interface (API) with the corresponding data management application, wherein the user request is a request for one or more source metadata objects that are dependent on a user-specified source metadata object and retrieving the expected source metadata objects comprises retrieving one or more source metadata objects that are dependent on the user-specified source metadata object from a corresponding source metadata repository based on internal relationships between the plurality of source metadata objects, and retrieving source metadata objects that are dependent on the user-specified source metadata object from any other source metadata repository based on external relationships between the plurality of source metadata objects.

29. A computer readable medium comprising executable instructions which when executed on a processing system cause said processing system to perform a method comprising:

receiving a user request pertaining to source metadata objects residing in a plurality of source metadata repositories within an organization, the plurality of source metadata repositories being maintained by a plurality of different data management applications; and in response to the user request, analyzing the user request to determine which of the source metadata objects a user expects to view, identifying one of the plurality of different data management applications that corresponds to the expected source metadata objects, and retrieving the expected source metadata objects using an application program interface (API) with the corresponding data management application, wherein the user request is a request for data flow with respect to a user-specified source metadata object, and retrieving the expected source metadata objects comprises retrieving one or more source metadata objects from which data flows to the user-specified source metadata object, and retrieving one or more source metadata objects to which data flows from the user-specified source metadata object.

30. A computer readable medium comprising executable instructions which when executed on a processing system cause said processing system to perform a method comprising:

receiving a user request pertaining to source metadata objects residing in a plurality of source metadata repositories within an organization, the plurality of source metadata repositories being maintained by a plurality of different data management applications; and in response to the user request, analyzing the user request to determine which of the source metadata objects a user expects to view, identifying one of the plurality of different data management applications that corresponds to the expected source metadata objects, and retrieving the expected source metadata objects using an application program interface (API) with the corresponding data management application, wherein the user request is a request for a map for data manipulations with respect to a user-specified source metadata object, and retrieving the expected source metadata objects comprises retrieving one or more source metadata objects from which data flows to the user-specified source metadata object, retrieving one or more source metadata objects to which data flows from the user-specified source metadata object, and obtaining information on occurring data manipulations during the data flow.

* * * * *